US012278907B2

United States Patent
Palakodety et al.

(10) Patent No.: US 12,278,907 B2
(45) Date of Patent: Apr. 15, 2025

(54) APPARATUS FOR SECURE MULTIPARTY COMPUTATIONS FOR MACHINE-LEARNING

(71) Applicant: Onai Inc., San Jose, CA (US)

(72) Inventors: Shriphani Palakodety, San Jose, CA (US); Patrick Grinaway, Brooklyn, NY (US); Galana Gebisa, Mountain View, CA (US); Volkmar Frinken, San Jose, CA (US); Jayavanth Shenoy, Mountain View, CA (US); Guha Jayachandran, Cupertino, CA (US)

(73) Assignee: Onai Inc., San Jose, CA (US)

( * ) Notice: Subject to any disclaimer, the term of this patent is extended or adjusted under 35 U.S.C. 154(b) by 295 days.

(21) Appl. No.: 17/675,663

(22) Filed: Feb. 18, 2022

(65) Prior Publication Data

US 2023/0269090 A1    Aug. 24, 2023

(51) Int. Cl.
*H04L 9/32* (2006.01)
*G06N 20/00* (2019.01)

(52) U.S. Cl.
CPC .......... *H04L 9/3247* (2013.01); *G06N 20/00* (2019.01); *H04L 2209/46* (2013.01)

(58) Field of Classification Search
CPC ..... H04L 9/3247; H04L 2209/46; H04L 9/50; H04L 9/3218; G06N 20/00; G06N 3/084; G06N 3/098; G06N 5/01; G06N 7/02; G06N 20/10
See application file for complete search history.

(56) References Cited

U.S. PATENT DOCUMENTS

| 2016/0012364 A1* | 1/2016 | Filgueiras | G06Q 50/01 705/7.13 |
| 2018/0316651 A1* | 11/2018 | Yang | H04W 12/122 |
| 2019/0012662 A1* | 1/2019 | Krellenstein | G06Q 20/3827 |

(Continued)

OTHER PUBLICATIONS

David Byrd, Antigoni Polychroniadou, Differentially Private Secure Multi-Party Computation for Federated Learning in Financial Applications, Oct. 22, 2020.

(Continued)

*Primary Examiner* — Daniel B Potratz
*Assistant Examiner* — Taylor P Vu
(74) *Attorney, Agent, or Firm* — Caldwell Intellectual Property Law

(57) ABSTRACT

An apparatus for secure multiparty computations for machine-learning is presented. The apparatus includes at least a processor and a memory communicatively connected to the at least a processor. The memory contains instructions configuring the at least a processor to submit a secure multiparty computation request onto an immutable sequential listing, wherein the secure multiparty computation request includes a contingent payment and an authenticity commitment of a first private dataset, receive at least a participant commitment from each participating device of a quorum of participating devices, generate a first localized model as a function of the first private dataset, and perform a joint training protocol as a function of the first localized model and a second localized model from the quorum of participating devices, wherein the joint training protocol includes generating a joint training datum.

20 Claims, 9 Drawing Sheets

(56) References Cited

U.S. PATENT DOCUMENTS

| | | | |
|---|---|---|---|
| 2019/0042937 A1 | 2/2019 | Sheller et al. | |
| 2019/0236394 A1* | 8/2019 | Price | G06V 10/945 |
| 2019/0306235 A1* | 10/2019 | Veale | H04L 63/123 |
| 2019/0311813 A1* | 10/2019 | Hie | G16H 10/40 |
| 2020/0242466 A1 | 7/2020 | Mohassel et al. | |
| 2020/0301793 A1* | 9/2020 | Tomlinson | G06F 11/1469 |
| 2020/0394552 A1 | 12/2020 | Ganapavarapu et al. | |
| 2021/0067339 A1 | 3/2021 | Schiatti et al. | |
| 2021/0312078 A1* | 10/2021 | Jayachandran | H04L 63/123 |
| 2021/0314140 A1 | 10/2021 | Stephenson et al. | |
| 2021/0391987 A1* | 12/2021 | Badrinarayanan | H04L 9/30 |
| 2021/0409220 A1 | 12/2021 | Seraj et al. | |
| 2022/0051240 A1* | 2/2022 | Shamai | G06Q 20/0655 |
| 2022/0068501 A1* | 3/2022 | Gholami | G16H 70/40 |
| 2022/0094555 A1* | 3/2022 | Roy | G06Q 20/065 |
| 2022/0255764 A1* | 8/2022 | Li | G06F 21/606 |
| 2022/0398343 A1* | 12/2022 | Ou | G06N 20/00 |
| 2023/0034384 A1* | 2/2023 | Mao | H04L 9/3247 |
| 2024/0020971 A1* | 1/2024 | Chatterjee | G06V 10/762 |

OTHER PUBLICATIONS

Qiang Yang, Yang Liu, Tianjian Chen, Yongxin Tong, Federated machine learning: Concept and applications, Jan. 28, 2019.

* cited by examiner

APPARATUS FOR SECURE MULTIPARTY COMPUTATIONS FOR MACHINE-LEARNING

FIELD OF THE INVENTION

The present invention generally relates to the field of secure multiparty computations. In particular, the present invention is directed to an apparatus for secure multiparty computations for machine-learning.

BACKGROUND

In a distributed system, similar institutions collect and analyze a plethora of similar data. These institutions make their data private for security reasons which also results in a loss of opportunity cost. As a result, it is difficult to analyze the data to its full potential.

SUMMARY OF THE DISCLOSURE

In an aspect, an apparatus for secure multiparty computations for machine-learning is presented. The apparatus includes at least a processor and a memory communicatively connected to the at least a processor. The memory contains instructions configuring the at least a processor to submit a secure multiparty computation request onto an immutable sequential listing, wherein the secure multiparty computation request includes a contingent payment and an authenticity commitment of a first private dataset, receive at least a participant commitment from each participating device of a quorum of participating devices, generate a first localized model as a function of the first private dataset, and perform a joint training protocol as a function of the first localized model and a second localized model from the quorum of participating devices, wherein the joint training protocol includes generating a joint training datum.

In another aspect, a method for secure multiparty computations for machine-learning is presented. The method includes submitting, by at least a processor instructed by a communicatively connected memory, a secure multiparty computation request onto an immutable sequential listing, wherein the secure multiparty computation request includes a contingent payment and an authenticity commitment of a first private dataset. The method further includes receiving at least a participant commitment from each participating device of a quorum of participating devices, generating a first localized model as a function of the first private dataset, and performing a joint training protocol as a function of the first localized model and a second localized model from the quorum of participating devices, wherein the joint training protocol comprises generating a joint training datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
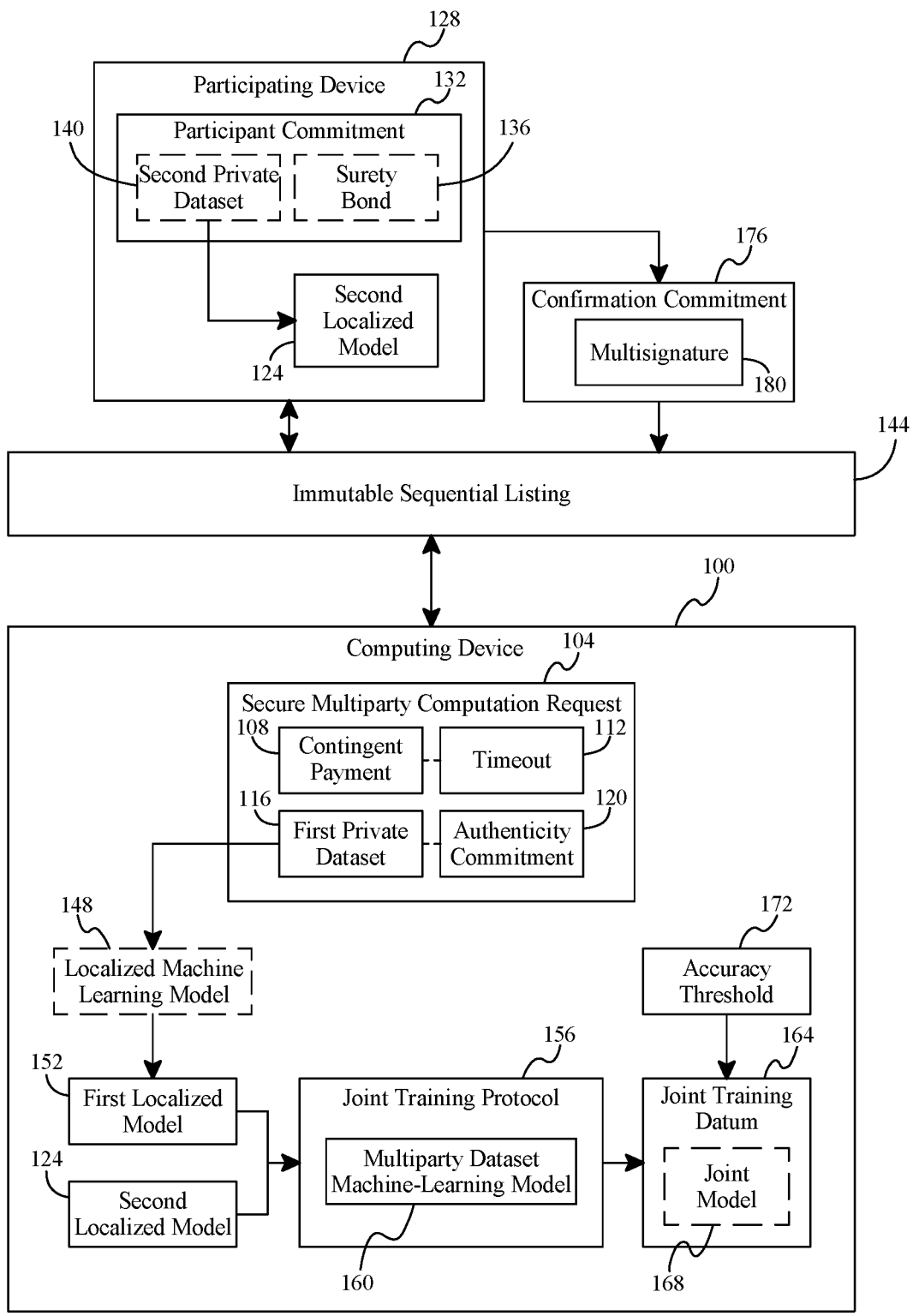
FIG. 1 is a block diagram of an exemplary embodiment of an apparatus for secure multiparty computations for machine-learning.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for secure multiparty computations for machine-learning. In an embodiment the apparatus can implement a blockchain. Blockchains can be used to incentivize participation in, and successful completion of, secure multiparty computation (MPC) protocols. For example, the apparatus involves reaching out to a party that wishes to pay for or sponsor a secure MPC. The MPC in this case could be a query, training a neural network, or some other operation. Aspects of the present disclosure can use joint model training on the datasets and/or models from each member of the party using an optimization algorithm. In an embodiment, the apparatus may use gradient averaging and/or stochastic gradient descent. Aspects of the present disclosure can reveal the results of the MPC protocols while maintaining privacy of each party member's provided datasets and/or models.

Aspects of the present disclosure can include incentivizing a party's participation in an MPC protocol. Aspects of the present disclosure can also allow decentralized MPC protocols, with authenticatable results, without the involvement of a trusted authority in the performance of the MPC protocols. In an embodiment, the apparatus submits a cryptographic commitment to an immutable sequential listing with a smart contract associated with a contingent payment. The immutable sequential listing may be public, at least in part, for any institution to view and participate in. The smart contract governs the incentive and the contingent payment to be provided to participating party members. Aspects of the present disclosure can also include submitting a smart contract governing the MPC protocol based on receiving a cryptographic commitment of a quorum of party members. In an embodiment, the apparatus incorporates a surety bond attached to the smart contract to ensure each party member of the quorum is liable for their individual participation in the MPC protocol and that upon the success of the MPC protocol, the contingent payment will be fulfilled.

Aspects of the present disclosure can also include scaling an MPC protocol for large numbers of participants. In an embodiment, the apparatus may scale the MPC protocol using a lottery function or random sampling scheme. This is so, at least in part, to group each participant and prevent the sub-models trained in the individual MPC groups from diverging too much from each other. In an embodiment, the apparatus may periodically average weights from selected participants and use that as a starting point for the next round of training. In another embodiment, apparatus may select participating members by requiring each participant to provide a zero knowledge proof onto the immutable sequential listing that the hash of the private key in the blockchain is beneath some threshold. Aspects of the present disclosure can also implement a cryptographic accumulator to scale a large number of participants for the MPC protocol. In an embodiment, the apparatus may involve a hierarchical structure constituting multiple MPC protocols wherein small groups of participants conduct an MPC amongst themselves, and then several of those group results are combined by another MPC, and so on, creating a tree-structure of MPC, culminating in an overall result.

Aspects of the present disclosure can be used to provide a solution for interoperability or consequences of covariate shifts. Aspects of the present disclosure can also be used in the application of healthcare. In an embodiment, the apparatus may submit a request for an MPC protocol to jointly train a model for a robust image data. For example, the apparatus may receive privatized image data from a quorum of participating health institutions such as CT scans, MRIs, X-rays, research, and the like thereof. The apparatus may ensure that each dataset or model of image data from the quorum is hidden. Aspects of the present disclosure can also ensure that each participant, the requester included, is following existing regulations related to the application.

Referring now to FIG. 1, an exemplary embodiment of an apparatus for secure multiparty computations for machine-learning is illustrated. The apparatus includes a computing device 100. Computing device 100 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 100 may include a single computing device operating independently, or may include two or more computing devices operating in concert, in parallel, sequentially or the like; two or more computing devices may be included together in a single computing device or in two or more computing devices. Computing device 100 may interface or communicate with one or more additional devices as described below in further detail via a network interface device. Network interface device may be utilized for connecting computing device 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 100 may include but is not limited to, for example, a computing device or cluster of computing devices in a first location and a second computing device or cluster of computing devices in a second location. Computing device 100 may include one or more computing devices dedicated to data storage, security, distribution of traffic for load balancing, and the like. Computing device 100 may distribute one or more computing tasks as described below across a plurality of computing devices of computing device, which may operate in parallel, in series, redundantly, or in any other manner used for distribution of tasks or memory between computing devices. Computing device 100 may be implemented using a "shared nothing" architecture.

With continued reference to FIG. 1, computing device 100 may be designed and/or configured to perform any method, method step, or sequence of method steps in any embodiment described in this disclosure, in any order and with any degree of repetition. For instance, computing device 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In a non-limiting embodiment, computing device 100 may be configured to perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. A further example of an asymmetric cryptographic system may include a discrete-logarithm based system based upon the relative ease of computing exponents mod a large integer, and the computational infeasibility of determining the discrete logarithm of resulting numbers absent previous knowledge of the exponentiations; an example of such a system may include Diffie-Hellman key exchange and/or public key encryption. Another example is elliptic curve cryptography, which relies on the fact that given two points P and Q on an elliptic curve over a finite field, a definition of the inverse of a point -A as the point with negative y-coordinates, and a definition for addition where A+B=-R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q. A further example of asymmetrical cryptography may include lattice-based cryptography, which relies on the fact that various properties of sets of integer combination of basis vectors are hard to compute, such as finding the one combination of basis vectors that results in the smallest Euclidean distance. Embodiments of cryptography, whether symmetrical or asymmetrical, may include quantum-secure cryptography, defined for the purposes of this disclosure as cryptography that remains secure against adversaries possessing quantum computers; some forms of lattice-based cryptography, for instance, may be quantum-secure.

With continued reference to FIG. 1, computing device 100 includes at least a processor and a memory communicatively connected to the at least the processor. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, the memory is configured to provide instructions to the at least a processor. The at least a processor is configured to submit a secure multiparty computation request 104 onto an immutable sequential listing 144. A "secure multiparty computation request," as used in this disclosure, is a cryptographic commitment indicating a request for a quorum of participating devices to jointly compute a multiparty computation with inputs while keeping those inputs private. A quorum of devices may act to provide a solution to covariate shift. A "covariate shift," as used in this disclosure, is a shift that occurs when the input distributions of the training and test sets differ while the conditional label distributions remain the same. For example and without limitation, given the differences in equipment and processes across institutions, models trained on one institution's data set may be unlikely to perform well on another institution's data set where an underlying data distribution changes, resulting in poor accuracy. A secure multiparty computation may be configured to incentivize a plurality of institutions and generate a join model based on a plurality of diverse datasets with improved accuracy.

With continued reference to FIG. 1, secure multiparty computation can be used for encrypted verification, authentication, and the like thereof. Secure multiparty computation together in an integrated system may allow users, institutions, devices, and the like thereof, to make any conceivable calculation using their private datasets in a completely secure and verifiable way. In some embodiments, an authentication server using the disclosed implementations can at once guarantee that both parties to the calculation are using genuine and un-tampered-with private datasets, and that the authentication server itself cannot intentionally or unintentionally violate the privacy of either party. For instance, a secure multiparty computation is a calculation that allows two or more parties to jointly calculate the output of a function over their inputs to the function, without revealing to each other or to any other party what their inputs are. The secure multiparty computation protocols may be info-theoretically secure, meaning that an adversary with unlimited computational power (operating within given assumptions) would be unable to discover any party's inputs. Other secure multiparty computation protocols may be secure as long as an adversary is assumed to be constrained to certain computational bounds. For example and without limitation, computing device 100 and participating computing devices may perform a secure multiparty computation using a calculation descriptor. In one embodiment, a calculation descriptor is a data structure that presents the calculation to be performed via secure multiparty computation in an abstract form, which may be shared among parties to the secure multiparty computation. The calculation descriptor may be a Boolean circuit. In some embodiments, a Boolean circuit is the design for a circuit of Boolean logic gates, such as AND, OR, XOR, and NOT gates, the evaluation of which would together produce the result to be calculated, given the inputs of the parties to the secure multiparty computation. Circuit may generally include any form of circuit, including an arithmetic circuit and/or analog circuit that models the intended calculation.

In a non-limiting embodiment, and still referring to FIG. 1, computing device 100 may provide functionality for exchanging secure shares. In one embodiment, a secure share is a datum that a party to a secure multiparty computation provides to the other parties to the secure multiparty computation, having the properties that the secure shares used by all parties to the computation, taken together, permit the computation to produce the desired output, while the possession by any party of less than all of the secure shares will not enable that party to deduce the inputs of the other parties to the secure multiparty computation. As a result, at least a subset of the secure shares can be freely exchanged, within the bounds of the protocol, without compromising the data privacy of any party. Some secure shares are info-theoretically secure, meaning that an adversary with unlimited computing power could never use the secure share to deduce the value of the input on which the secure share was based. Other secure shares are secure against adversaries whose computational power is less than some specified limit.

In some embodiments, and still referring to FIG. 1, the secure multiparty computation used to calculate a matching score may further include a garbled circuit protocol. The garbled circuit protocol may be a version of Yao's Garbled Circuits. The garbled circuit protocol may be a GESS protocol. In some embodiments, computing device 100 may derive at least two secure shares for each input computing device 100 has for an input wire. Computing device 100 transmits one of the at least two shares to participating device 128 via an oblivious transfer. Participating device 128 uses the received secure share and its input to calculate the output of the gate to which the wire corresponds. In some embodiments, that process is repeated for each gate until the complete circuit has been evaluated. In some embodiments, participating device 128 generates the secure shares, and computing device 100 receives the secure shares. In some embodiments, computing device 100 generates the secure shares for some gates and participating device 128 generates the secure shares for other gates. In some embodiments, computing device 100 generates the secure shares for some output bits and participating device 128 generates the secure shares for other output bits. Persons skilled in the art, upon reviewing the entirety of this disclosure, will be aware of the various embodiments of processes of secure multiparty computation in the context of secure shares.

With continued reference to FIG. 1, an "immutable sequential listing," as used in this disclosure, is a data structure that places data entries in a fixed sequential arrangement, such as a temporal sequence of entries and/or blocks thereof, where the sequential arrangement, once established, cannot be altered or reordered. The immutable sequential listing as used in this disclosure is further described in FIG. 4. In a non-limiting embodiment, secure multiparty computation request 104 may include a smart contract. A "smart contract," as used in this disclosure, is an algorithm, data structure, and/or a transaction protocol which automatically executes, controls, documents, and/or records legally relevant events and actions according to the terms of a contract. In a non-limiting embodiment, computing device 100 may be configured to deploy secure multiparty computation request 104 onto immutable sequential listing 144 using a digitally signed assertion. A "digitally signed assertion," as used in this disclosure, is a collection of textual data signed using a secure proof. A digitally signed assertion as used in this disclosure is further described in FIG. 4.

In a non-limiting embodiment, the apparatus of FIG. 1 may generate, evaluate, and/or utilize digital signatures. In some embodiments, computing device 100 may submit a digitally signed assertion for secure multiparty computation request 104 to be deployed onto immutable sequential listing 144 using a digital signature. A "digital signature," as used herein, includes a secure proof of possession of a secret by a signing device, as performed on a provided element of data, known as a "message." A message may include an encrypted mathematical representation of a file or other set of data using the private key of a public key cryptographic system. Secure proof may include any form of secure proof as described in further detail below, including without limitation encryption using a private key of a public key cryptographic system as described above. Signature may be verified using a verification datum suitable for verification of a secure proof for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file. In some embodiments, the digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. In a non-limiting embodiment, the digital certificate may include a digital signature. In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. Persons skilled in the art, upon reviewing the entirety of this disclosure, will be aware of the various embodiments and implementations of using digital signatures for purposes as described herein.

With continued reference to FIG. 1, secure multiparty computation request 104 may include a specific requirement for a quorum of participating devices to accept secure multiparty computation request 104 for a multiparty computation to be conducted. A "quorum of participating devices," as used in this disclosure, is a minimum number of computing devices that must participate for a multiparty computation to occur. A "participating device," as used in this disclosure, is a computing device configured to train at least a model using its own private datasets required for a multiparty computation as denoted by secure multiparty computation request 104. In a non-limiting embodiment, each participating device may have access to immutable sequential listing 144 where secure multiparty computation request 104 is posted. Any participating device may accept secure multiparty computation request 104. In some embodiments, computing device 100 may perform some filter or screen to identify and/or select qualified participating devices for secure multiparty computation request 104. For example and without limitation, participating device 128 may include a computing device interested in participating in a multiparty computation of secure multiparty computation request 104 which is publicly available on immutable sequential listing 144.

With continued reference to FIG. 1, secure multiparty computation request 104 may include a contingent payment 108. A "contingent payment," as used in this disclosure, is a conditional payment that is executed in the event the conditions of the payment are met. For example and without limitation, contingent payment 108 may include a financial contract consisting of a payment amount to be distributed to the parties accepting secure multiparty computation request 104. Contingent payment 108 dictates the transfer of funds based on a condition that the parties appropriately completes secure multiparty computation request 104. In another non-limiting example, contingent payment 108 may include an up-front initial payment of 50% of the payment amount to be given to the participating parties wherein the remaining payment amount is given as a result of the completion of secure multiparty computation request 104. In a non-limiting embodiment, contingent payment 108 may include a smart contract wherein the smart contract governs the execution of contingent payment 108. Computing device 100 may be configured to execute and/or fulfill contingent payment 108 by providing a payment amount to the quorum of participating devices partaking in the multiparty computation denoted by secure multiparty computation request 104. Persons skilled in the art, upon reviewing the entirety of this disclosure, will be aware of the various embodiments of payments in the context of financial contracts.

In a non-limiting embodiment, and still referring to FIG. 1, contingent payment 108 may include a locked payment. A "locked payment," as used in this disclosure, is a payment that a paying party is committed to but may only be processed upon a contingent event occurring. Thus, once a locked payment has been posted, it may be irrevocable for the payer that posts it, but unavailable to the recipient device until the latter has performed an action upon which unlocking the payment is contingent. As a non-limiting example, a locked payment may include a zero-knowledge contingent payment. A "zero-knowledge contingent payment," as used in this disclosure, is a payment that is posted in a non-spendable form, which may be converted to a spendable form by provision of an element of data. A proprietor and/or community operating some immutable sequential listing may require a secure proof, a password, or other provision of datum and/or proof of performance of a given process as a condition for a valid expenditure of value in the zero-knowledge contingent payment. In an embodiment, computing device 100 may create a locked payment as a good-faith bond, for instance to insure against the possibility of loss of data or the like; locked payment may be released upon failure of computing device 100 to demonstrate storage of data.

With continued reference to FIG. 1, contingent payment 108 may be associated with a timeout 112. A "timeout," as used in this disclosure, is a time limit contingent with a secure multiparty computation request configured to cancel the request in the event the time limit is reached. For example and without limitation, computing device 104 may generate secure multiparty computation request 104 to be canceled and/or removed from immutable sequential listing 144 once the time limit is reached. In another non-limiting example, secure multiparty computation request 104 may be canceled and/or removed from immutable sequential listing 144 if the time limit is reached before a quorum of participating devices accepts secure multiparty computation request 104. For instance, secure multiparty computation request 104 may require three participating devices to partake in a multiparty computation. Even if a majority or participating devices and/or two participating devices may accept secure multiparty computation request 104 prior to timeout 112, secure multiparty computation request 104 will automatically remove itself from immutable sequential listing 144 and return contingent payment 108 back to computing device 100. Persons skilled in the art, upon reviewing the entirety of this disclosure, will be aware of the various embodiments of a timer in the context of a pending request.

With continued reference to FIG. 1, computing device 100 may include a first private dataset 116 to be submitted with secure multiparty computation request 104 onto immutable sequential listing 144. A "private dataset," as used in this disclosure, is a specific type of data associated with a computing device and hidden from other computing devices. In a non-limiting embodiment, a private dataset is a specific type of data that the issuer of secure multiparty computation request 104 desires to train and/or utilize for a multiparty computation. First private dataset 116 may include a dataset only computing device 100 has access to the contents of. In a non-limiting embodiment, second private dataset 140 may include a dataset that only participating device 128 has access to the contents of. In a non-limiting example, a private dataset for a multiparty computation in a healthcare application may include medical records, image data, biological data, and the like thereof. In another non-limiting embodiment, first private dataset 116 may be generated and/or provided by another party, institution, and/or device.

For instance, computing device 100 may act as a sponsor for an outside institution seeking participants for a secure multiparty computation. Persons skilled in the art, upon reviewing the entirety of this disclosure, will be aware of the privatization of individual devices in the context of secure multiparty computation.

With continued reference to FIG. 1, computing device 100 may provide authenticity of first private dataset 116 in secure multiparty computation 104 with an authenticity commitment 120. An "authenticity commitment," as used in this disclosure, is a digitally signed assertion and/or cryptographic commitment vouching for first private dataset 116. In a non-limiting embodiment, authenticity commitment 116 may include a Pedersen commitment. A "commitment," as used herein, is a cryptographic algorithm that allows the user to commit to a certain value without revealing it. For example, a computing device and/or participating device may be required to enter some secret with a private key as a commitment. This may be used to verify user identity to prove possession of an identifier later on when the commitment is opened. A "Pedersen commitment," as used herein is a specific type of commitment that uses a secret message with at least two elements, a random secret, and a commitment algorithm that produces a commitment as a function of the secret message and a random secret. A receiver/verifier is given the commitment, secret message, and random secret and can verify the commitment by putting the secret message and random secret back into the commitment algorithm. A cryptographic commitment may additionally or alternatively include a cryptographic hash of a computing device and/or participating device, and/or a cryptographic accumulator such as a Merkle tree. In an example, a hash of the commitment may be compared to the hash of the actual user password to verify user identity. Additionally or alternatively, a commitment may use a personal identification number, mnemonic device, biometric key/datum, and the like.

Authenticity commitment 116 may include any proof such as a zero-knowledge proof. In some embodiments, authenticity commitment 120 is an assertion that first private dataset 116 is not maliciously manipulated by computing device 100. In another embodiment, authenticity commitment 120 may serve as another incentive for participating devices to accept secure multiparty computation request 104 since the participating devices may be assured that the private dataset of the issuer of secure multiparty computation 104 is not inaccurate and/or manipulated. This is so, at least in part, to provide another security to the participating devices since they would have to provide its own private datasets in the multiparty computation requested by the issuer. In a non-limiting embodiment, authenticity commitment 120 may be associated with a smart contract of secure multiparty computation 104 which may enable first private dataset 116 and/or model to be revealed to each participating device of secure multiparty computation 104 once completed so that each participating device may verify that first private dataset 116 and/or model used for the multiparty computation falls within some minimum accuracy relative to its own private datasets and/or models. Persons skilled in the art, upon reviewing the entirety of this disclosure, will be aware of the various embodiments of a secure multiparty computation request in the context of incentives.

With continued reference to FIG. 1, computing device 100 may be configured to receive at least a participant commitment from each participating device of a quorum of participating devices. A "participant commitment," as used in this disclosure, is a cryptographic commitment representing an indication of a participating device's intention to partake in the multiparty computation denoted by secure multiparty computation request 104. Computing device 100 may select amount of plurality of participating devices that accepted secure multiparty computation request 104 based on some metric, scheme, and the like thereof. In a non-limiting embodiment, secure multiparty computation request 104 may include an insurance requirement associated with contingent payment 108 to be received from a participating device. An "insurance requirement," as used in this disclosure, is a collateral or a surety bond that insures to the issuer of secure multiparty computation 104 that any payment given to a participating device of secure multiparty computation 104 to be forfeit if one or more participating devices behaved inappropriately in the multiparty computation of secure multiparty computation request 104. For example and without limitation, if participating device 128 re-designs, manipulates, and/or falsify second private dataset and/or second localized model 124 in the multiparty computation, contingent payment 112 is rescinded and participating device 128 forfeits any payment received and surety bond 136. In an embodiment, a purpose of such implementation may be that each involved party of secure multiparty computation request 104 is liable for its own actions. Persons skilled in the art, upon reviewing the entirety of this disclosure, will be aware of the various measures of contingency in the context of decentralized computation.

With continued reference to FIG. 1, each device participating in secure multiparty computation 104 may be configured to train its own private datasets. This may include each device generating a localized model as a function of their private datasets. A "localized model," as used in this disclosure, is a collection of information describing a result of an algorithm used on a private dataset. A localized model may include any machine-learning model including a linear equation, any other equation, a neural network or portion thereof, and the like thereof. In some embodiments, a computing device may implement and/or incorporate any machine-learning process, including without limitation stochastic gradient descent, least-squares regression, weighted average, and the like thereof. In a non-limiting embodiment, each device may generate a localized model using a localized machine-learning model. A "localized machine-learning model," as used in this disclosure, is any machine-learning model, process, and/or algorithm to produce a localized model. Persons skilled in the art, upon reviewing the entirety of this disclosure, will be aware of the various embodiments of machine-learning in generating a model for purposes as described herein.

With continued reference to FIG. 1, computing device 100 may generate first localized model 152 using first private dataset 116. Alternatively or additionally, first localized model 152 may be received by another device such as a participating device of a quorum of participating devices volunteering to be the sponsor of a secure multiparty computation. In a non-limiting embodiment, computing device 104 may train localized machine-learning model 148 to output first localized model 152. In some embodiments, localized machine-learning model 148 may be trained using a machine-learning algorithm incorporating first private dataset 116. For example and without limitation, localized machine-learning model 148 may compute a local gradient on first private dataset 116 to output first localized model 148. For instance, a private dataset may include information about a plurality of individuals such as, but not limited to, sugar intake, blood pressure, glucose levels, and the like thereof. The private dataset may also include information identifying diabetes, individuals with diabetes, and other health conditions. A localized machine-learning model may consolidate the private dataset to generate a localized model describing a prediction that an individual may have diabetes. In another embodiment, participating device 128 may generate second localized model 124 as a function of second private dataset 140. Participating device 128 may include a localized machine-learning model configured to output second localized model as a function of second private dataset. Second localized model 124 may be generated similarly to first localized model 152. In a non-limiting embodiment, first localized model 152 may be received from an outside party, institution device, and the like thereof. For instance, the outside party may provide first localized model 152 to computing device 100 for secure multiparty computation without computing device 100. Persons skilled in the art, upon reviewing the entirety of this disclosure, will be aware of the various applications for a localized machine-learning model in the context of multiparty computation.

With continued reference to FIG. 1, computing device 100 may be configured to perform a joint training protocol 156 as a function of first localized model 152 and second localized model 124. A "joint training protocol," as used in this disclosure is a multiparty computation, which may include a secure multiparty computation, denoted by secure multiparty computation request 104 to generate a result such as joint training datum 164. A "joint training datum," as used in this disclosure, is a collection of information describing the results of joint training protocol 156 and/or multiparty dataset machine-learning model 160. In a non-limiting embodiment, joint training datum 164 may include a prediction. In a non-limiting embodiment, joint training protocol 156 may include combining first localized model 152 and second localized model 124. Combination may include performance of a secure average step using any secure multiparty process. For example and without limitation, joint training protocol 156 may include a calculation process in which computing device 100 and/or participating device 128 perform a calculation together that is based on first private dataset 116 and/or second private dataset 140. In another embodiment, a calculation process may include a calculation based on first localized model 152 and/or second localized model 124. In some embodiments, joint training protocol 156 may include Yao's garbled circuits and the like.

With continued reference to FIG. 1, joint training protocol 156 may include generating joint training datum 164 as a function of a multiparty dataset machine-learning model 160. A "multiparty dataset machine-learning model," as used in this disclosure, is any machine-learning model, process, and/or algorithm configured to output joint training datum 164. In a non-limiting embodiment, multiparty dataset machine-learning model 160 may use first localized model 152 and second localized model 124 as inputs. In some embodiments, multiparty dataset machine-learning model 160 may utilize a decision tree, random forest classifiers, majority voting, weighted voting, simple averaging, weighted averaging, and the like thereof. In some embodiments, multiparty dataset machine-learning model 160 may incorporate machine-learning methods such as an ensemble method. An "ensemble method," as used in this disclosure, is a machine learning technique that combines several models such as first localized model 152 and second localized model 124 in order to produce one optimal predictive model such as joint model 168. For example and without limitation, joint training protocol 156 may incorporate stacking multiple machine-learning models to produce joint model 168. A "joint model," as used in this disclosure, is an optimized predictive model trained by each party member of secure multiparty computation request 104. In a non-limiting embodiment, multiparty dataset machine-learning model 160 may include any machine-learning model including a linear equation, any other equation, a neural network or portion thereof, and the like thereof. In some embodiments, joint training datum 164 and/or joint model 168 may be generated as a function of any machine-learning process, including without limitation stochastic gradient descent, least-squares regression, weighted average, and the like thereof. Persons skilled in the art, upon reviewing the entirety of this disclosure, will be aware of the various embodiments of machine-learning methods for purposes as described herein.

With continued reference to FIG. 1, joint training datum 164 and/or joint model 168 may be verified based on an accuracy threshold 172. An "accuracy threshold," as used in this disclosure, is a value denoting an acceptable and/or unacceptable level of deviation of data. In a non-limiting embodiment, accuracy threshold 172 may include a fuzzy set as described in further detail in FIG. 5. For example and without limitation, joint training datum 164 and/or joint model 168 may achieve a minimum accuracy level denoted by accuracy threshold 172, thus resulting in a successful multiparty computation. In another example, joint training datum 164 and/or joint model 168 may not reach the minimum accuracy level denoted by accuracy threshold 172, thus resulting in a failed multiparty computation. A failed multiparty computation may result as a function of tampered datasets, inappropriate behavior by one or more devices, re-designed datasets, manipulated datasets, and the like thereof. A failed multiparty computation may result as a function of no deceptive and/or inappropriate action, rather, because of largely inconsistent datasets among the provided private datasets of each device. Persons skilled in the art, upon reviewing the entirety of this disclosure, will be aware of the various embodiments of a resulting model and/or prediction for purposes as described herein.

With continued reference to FIG. 1, in the event a successful result and/or successful multiparty computation is achieved, computing device 100 may enable the verification of joint training datum 164 and/or joint model 168. As used in this disclosure, "verification" is a process of ensuring that which is being "verified" complies with certain constraints, for example without limitation system requirements, regulations, and the like. In some cases, verification may include comparing a product, such as without limitation, a private dataset, joint training datum 164, and/or joint model 168 against one or more acceptance criteria. For example, in some cases, joint model 168 may be required to fall within accuracy threshold 172. Ensuring that joint model 168 is in compliance with acceptance criteria may, in some cases, constitute verification. In some cases, verification may include ensuring that the private dataset used by the issuer of secure multiparty computation 100 achieves a minimum accuracy level comparable to the private datasets provided by the quorum of participating devices. In some cases, verification may include ensuring that data is complete, for example that all required data types are present, readable, uncorrupted, and/or otherwise useful for computing device 100. In some cases, some or all verification processes may be performed by computing device 100. In some cases, at least a machine-learning process, for example a machine-learning model, may be used to verify. Computing device 100 may use any machine-learning process described in this disclosure for this or any other function. In some embodiments, at least one of validation and/or verification includes without limitation one or more of supervisory validation, machine-learning processes, graph-based validation, geometry-based validation, and rules-based validation. As used in this disclosure, "validation" is a process of ensuring that which is being "validated" complies with stakeholder expectations and/or desires. Stakeholders may include users, administrators, property owners, customers, and the like. Very often a specification prescribes certain testable conditions (e.g., metrics) that codify relevant stakeholder expectations and/or desires. In some cases, validation includes comparing a product, for example without limitation a private dataset, joint training datum 164, and/or joint model 168, against a specification. In some cases, computing device 100 may be additionally configured to validate a product by validating constituent sub-products. In some embodiments, computing device 100 may be configured to validate any product or data, for example without limitation a private dataset, joint training datum 164, and/or joint model 168. In some cases, at least a machine-learning process, for example a machine-learning model, may be used to validate by computing device 100. Computing device 100 may use any machine-learning process described in this disclosure for this or any other function. Persons skilled in the art, upon reviewing the entirety of this disclosure, will be aware of the various embodiments of verification and validation for purposes as described herein.

In a non-limiting embodiment, and still referring to FIG. 1, computing device 100 may post a cryptographic commitment to immutable sequential listing 144 proving that authenticity of joint training datum 164 and/or joint model 168. This may include revealing first private dataset 116 to each participating device of the quorum of participating devices. The proof may be carried out by any proof as described in the entirety of this disclosure. In another non-limiting embodiment, computing device 100 may provide proof as a function of a cryptographic function. The cryptographic function may reveal any withheld private dataset and/or localized model for verification. A "cryptographic function," as used in this disclosure, is any function that generates an output that may be conclusively linked via proof or verification to each participating device, but from which it is impossible and/or computationally infeasible to discover the contents of private datasets used in joint training datum 164 and/or joint model 168. For instance and without limitation, the cryptographic function may be consistent with the cryptographic function in U.S. patent application Ser. No. 16/884,460, and entitled, "METHODS AND SYSTEMS FOR CRYPTOGRAPHICALLY SECURED DECENTRALIZED TESTING," which is incorporated by reference herein in its entirety. In an embodiment, cryptographic function may produce a cryptographic hash, also referred to by the equivalent shorthand term "hash," of computing device 100. A cryptographic hash, as used herein, is a mathematical representation of a lot of data, such as files or blocks in a blockchain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, and continuing to refer to FIG. 1, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Alternatively or additionally, and still referring to FIG. 1, output of cryptographic function may include a secure proof of possession of secret test result 112. A secure proof, as used herein, is a protocol whereby an output is generated that demonstrates possession of a secret, such as a secret test result 112 identifier, without demonstrating the entirety of the secret; in other words, a secure proof by itself, is insufficient to reconstruct the entire secret, enabling the production of at least another secure proof using at least a secret. Where at least a secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a secret, for instance as used in a single challenge-response exchange.

In a non-limiting embodiment, the proof may include a zero-knowledge proof, which may provide an output demonstrating possession of a secret while revealing none of the secret to a recipient of the output. Zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and still referring to FIG. 1, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup. ZK-STARKS may not rely on private-public key pairings but may rely on collision resistant hashing and a random oracle model. Collision resistant hashing may be measured if it is hard to find two inputs that hash to the same output, that is two inputs such as a and b such that $H(a)=H(b)$, and $a \neq b$. Collision resistant hash functions may include a strong one-way hash function. ZK-STARKS may utilize collision-resistant hash functions to convert a STIK into an interactive argument of knowledge system, whereby a STIK is defined as a Scalable Transparent Interactive Oracle Proof of Knowledge. A ZK-STIK may be proven to be unconditionally sound, even against computationally unbounded provers. If the STIK has perfect ZK, then the argument system has computational ZK. Any realization of a STIK using this technique may be considered interactive. Collision resistance may be desirable for example, when a party may attest to a document by publishing a public key signature on a hash of the document. A malicious actor may be able to get a party to attest to one document and then produce another document copying that attestation thereby producing the same hash and claiming the other party had attested to both documents. Collision resistance hashing may also be employed for example when parties compare cryptographic hashes of two instances of a file to make sure they both have the same version. A bad actor could produce two files each containing the same hash and trick users into believing they had the same version of a file when in fact they did not. ZK-STARKS may also utilize a random oracle model. Random oracle output may include an output that responds to every unique query with a truly random or pseudorandom response chosen uniformly or preferentially from its output domain; in an embodiment, a pseudorandom output is one that is infeasible to predict prior to performing steps of random oracle, such as without limitation an output including an output of a cryptographic hash function performed on each unique query. If a query is repeated the output may respond the same way every time that query is submitted. In an embodiment, a random oracle output may include a mathematical function chosen uniformly at random, so that each possible query has an output of a fixed random response. A random oracle may include a verifiable delay function, e.g. a function based on exponentiation in a group of unknown order, a verifiable random function as demonstrated by DFINITY of Zug, Switzerland, a random beacon, such as without limitation a high entropy source such as true random number generator (TRNG) that is signed and time-stamped by a device with trusted properties. Using the random oracle model any STIK can be compiled into a non-interactive argument of knowledge in the random oracle knowledge. If the STIK has perfect ZK then the resulting construction has computational zero knowledge. Realization of a STIK using this technique may be considered non-interactive STARK. Decisions as to whether to use interactive or non-interactive ZK-STARKS may be determined by requesting device 104 and/or system designer.

With continued reference to FIG. 1, zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

Still referring to FIG. 1, cryptographic function may be performed using one or more privacy-preserving protocols. A "privacy-preserving protocol," as used in this disclosure, is a protocol that makes it impossible or computationally infeasible to determine an identity of a party performing a test, who may be referred to as a "tester" for the purposes of this disclosure, given an output of the cryptographic function. As a non-limiting example, where a test issuer distributes test kits, tester may be able to publicly report and prove the validity of a result using a privacy-preserving protocol, without the test issuer being able to map that result to a given tester, even if the test issuer has kept track of which test kit (with what code) it issued to what tester. In an embodiment, privacy-preserving protocol may include participation by test issuer and/or operator of computing device 104 or other device operated by a test issuer (any of which may be referred to for the purposes of discussion of this discussion of privacy-preserving protocols as a "test issuer") and one or more testers and/or devices operated thereby, including without limitation a secure test apparatus 108, and/or user device, where tester and/or device operated thereby may be referred to for the sake of discussion of privacy-preserving protocols as the tester, in a set of intercommunications, exchanges of information, and/or instantiation and/or evaluation of cryptographic objects and/or primitives to enact privacy-preserving protocol. In an exemplary embodiment, a test issuer, prior to any testing, may publish to data store, including without limitation an immutable sequential listing and/or any data store described in this disclosure, a cryptographic commitment as defined below to a set of all potential exposed secret test result identifiers across all tests. Non-limiting examples of cryptographic commitments are Pedersen commitments and Fujisaki-Okamoto commitments. Using a one-out-of-many cryptographic proof, a tester may issue a proof that it knows one of those codes without revealing which of them it knows. As a non-limiting example, a one-of-many proof may be performed with respect to a list of commitments, such as Pedersen commitments, sounding in homomorphic cryptographic systems, which may include a list of commitments to set of all potential exposed secret test result identifiers across all tests. A prover, such as a user device and/or secure testing apparatus, may demonstrate knowledge of an opening of commitment $C\_i = g^x h^z h^{s'}$, for g, h, generators over a group used as a basis for the encryption, by revealing (z+s). Verification may be performed by multiplying each of the commitments by $h^{-(z+s)}$; for $C\_i$, this will result in a commitment to 1 (i.e., it may be demonstrated that this is an encryption of 1). Thus, knowledge of the opening of an element of the set of commitments may be demonstrated without revealing which element is known or opening the commitment. Furthermore, a one-out-of-many proof may reveal a serial number such that it cannot be issued multiple times for the same element without detection; in the above example, (z+s) may be public and formed using the serial number and secret key of the test kit, and thus duplicate proof attempts may be detected. This may prevent a single result from being reported by many individuals without detection.

As a further non-limiting example, and still referring to FIG. 1, a privacy-preserving function may be performed using a combination of techniques from cryptographic computation families of multiparty computation and oblivious transfer. In one illustrative example, a test issuer may distribute test kits to testers. Each test kit may include code, such as a QR code or other code that is visible, which may have a small number of bits. Each test kit also may include a secret test result, which may have a small number of bits. Test issuer may potentially have recorded which test kit it gave to which tester. In an embodiment, tester may perform test and send to test issuer $g^x h^y$ where x and y are random numbers, g and h are group elements over an elliptic curve group, such as without limitation elements of a group over Curve25519, and q is a visible code on the test kit. The tester may also use the exposed code from the test kit, here denoted for purposes of discussion as "b," to request a result-specific result from the issuer via oblivious transfer. For instance, for a set of s codes indexed by b, where one of them (s') indicates a positive, an honest positive tester will have revealed the index b that corresponds to s'; to retrieve s', the tester may engage in oblivious transfer with the test issuer, such as without limitation via the chou orlandi scheme. This may prevent test issuer from knowing whether tester has a correct positive b or a different one. As used herein, an "oblivious transfer" is a protocol whereby a recipient, such as without limitation tester, requests one or more values of a plurality of values from a sender, such as without limitation test issuer, which then returns the requested values to recipient, without the sender being able to know which values the sender has transmitted and without the recipient learning any of the plurality of values besides the requested values. Test issuer may determine whether test issuer has previously received a query and/or request for oblivious transfer referencing q; if so, test issuer may ignore request, to avoid attacks where a tester queries repeatedly to undermine the integrity of system 100 by posting multiple results. Issuer may return a numerical code at index b to tester from a list of codes, as part of the oblivious transfer exchange, where numerical code may be implemented in any manner as described above. Note that, by virtue of oblivious transfer protocol, issuer may not know what index tester sent or what code it has sent back to tester. Test issuer may publish $g^x h^y h^s = g^x h^{(y+s)}$ to data repository 124 or other data store where s is the code that would have been exposed on the test kit if the result were positive. A similar publication, without loss of generality, may be made for negative results. Tester may now create a 1-out-of-many proof as described above to prove a given result without revealing its identity. Value y+s, which may be unique and/or unpredictable, may be exposed as part of the proof which may ensure that no party or listener can issue another proof using the same test; in other words, a given test result may be reportable only once if following the protocol. In order to mitigate ability of test issuer or other parties to conduct time correlations between the steps above, the tester may utilize a stochastic delay function, whereby a party receives a message to forward, but selects a random waiting time to forward it, thus eliminating the time correlation between receiving a message and forwarding it. In an embodiment, a stochastic delay, for instance and without limitation drawn from an exponential distribution, may mitigate correlation attacks; stochastic delay function may be employed between each step, possibly with longer waits when there is lower reporting activity on the blockchain. In an embodiment, the above-described protocol may be useful in a situation where secret test result on secure test apparatus 108 is unable to encode sufficient bits to be highly difficult to predict.

With continued reference to FIG. 1, verifying joint training datum 164 and/or joint model 168 may include receiving a plurality of proofs from each participating device of the quorum of participating devices. This may be achieved by a confirmation commitment 176 submitted by each participating device of the quorum of participating devices for computing device 100 to verify that each participating device's localized models and/or private datasets achieves the same minimum accuracy level. A "confirmation commitment," as used in this disclosure, is a cryptographic commitment to be posted onto immutable sequential listing 144 that proves that the private dataset and/or localized model of a participating device achieves a minimum level of accuracy as denoted by accuracy threshold 172. In a non-limiting embodiment, the proof of each participating device as denoted by confirmation commitment 176 may be consistent with any secure proof or cryptographic function as described herein.

With continued reference to FIG. 1, confirmation commitment 176 may be digitally signed via a multisignature 180. A "multisignature," as used in this disclosure, is a digital signature attesting the integrity of a participating device in the multiparty computation and/or the integrity of the private dataset and/or localized models provided by the participating device in the multiparty computation. In a non-limiting embodiment, multisignature 180 may include a plurality of signatures from each participating device. For instance, even if a successful multiparty computation is achieved, if one or more participating devices behaved inappropriately by not participating with integrity and/or providing manipulated data, the multiparty transaction of contingent payment 108 may be revoked in which each participating device must forfeit any outstanding contingent payment 108 and surety bond 136. This process may be governed by a smart contract embedded in secure multiparty computation request 104. In another non-limiting example, in the event each participating device and computing device 104 behaved appropriately, each participating device submits confirmation commitment 176 and deploys a proof of performance onto immutable sequential listing 144, enabling a multiparty transaction of contingent payment 108. Thus, contingent payment 108 may be fulfilled and distributed among each participating device. This process may also be governed by a smart contract embedded in secure multiparty computation request 104. Persons skilled in the art, upon reviewing the entirety of this disclosure, will be aware of the various embodiments of a multiparty transaction for purposes as described herein.

Figure 2:
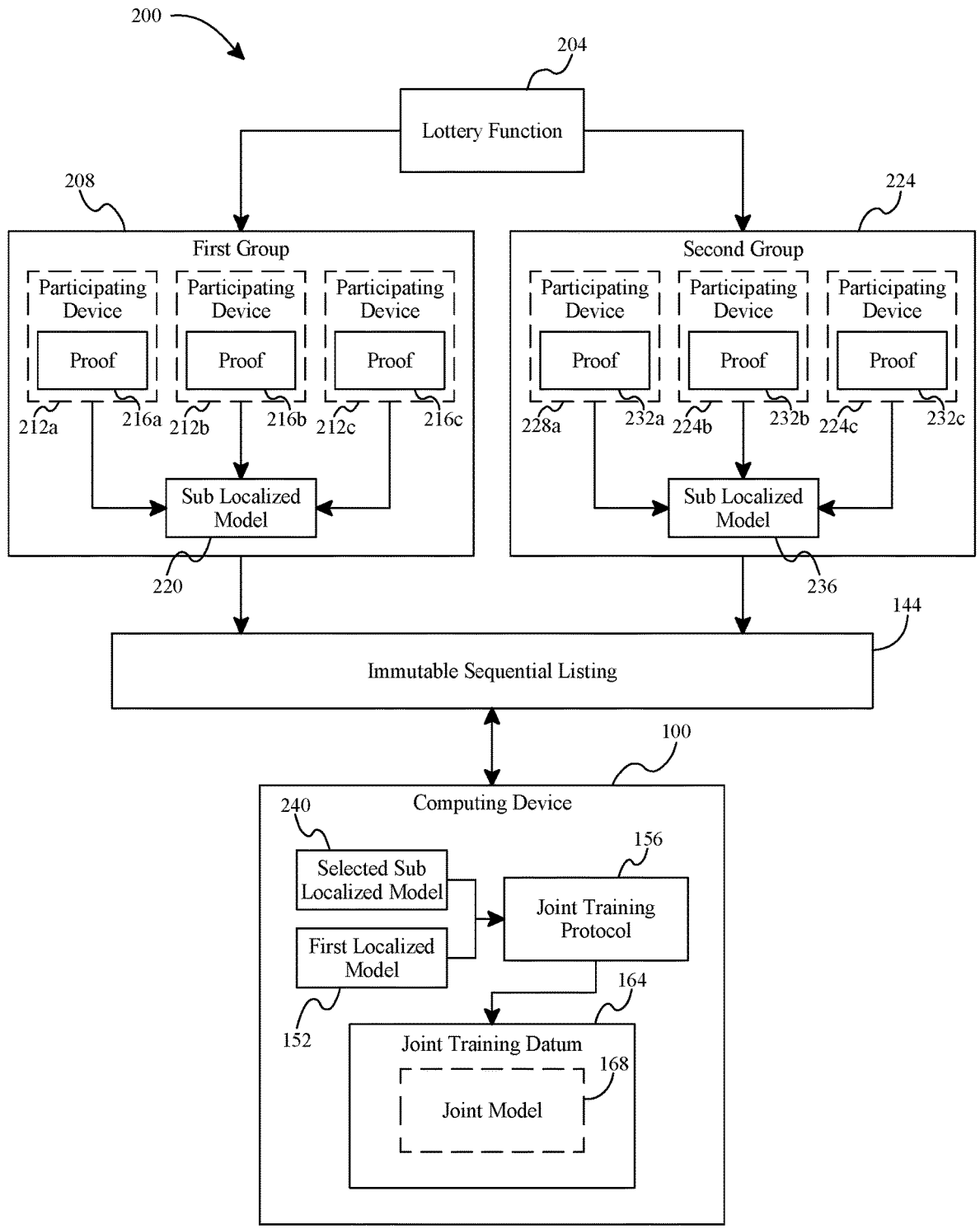
FIG. 2 is a block diagram of an exemplary embodiment of a scalable multiparty computation.

Referring now to FIG. 2, a block diagram of an exemplary embodiment of a scalable multiparty computation 200 is illustrated. Scalable multiparty computation 200 may include a random sampling scheme. In a non-limiting embodiment, computing device 100 may receive an exceeding number of participating devices required for a secure multiparty computation. To combat this, apparatus 100 may scale the secure multiparty computation by implementing a lottery function 204 to randomly group and select a qualified group of participating devices. A "lottery function," as used in this disclosure, is a sampling scheme used to group a plurality of participating devices wherein each group is diverse enough yet do not produce localized models that diverge significantly from each other and selecting a group wherein each group has an equal probability of being chosen. Random sampling scheme 204 may include dividing a plurality of participating devices into groups, such as first group 208 and second group 224. Each group may include a plurality of participating devices configured to perform its own secure multiparty computation and/or joint training protocol. In a non-limiting embodiment, participating devices may be divided by a verifiable lottery. For example and without limitation, each participating device may be configured to submit a proof to be posted onto immutable sequential listing 144. The proof may include a zero knowledge proof and/or any proof as described in the entirety of this disclosure. The proof of each participating device may represent a "lottery ticket" which can also include a secret key known only to its respective participating device. For example and without limitation, a participating device may provide a zero knowledge proof that the cryptographic hash of the secret key used to post onto immutable sequential listing 144 is recognized and/or verified by immutable sequential listing 144. In some embodiments, the cryptographic hash of the secret key may be recognized and/or verified based on some accuracy level.

Still referring to FIG. 2, computing device 100 may utilize lottery function 204 to group the plurality of participating devices and incorporate a variety of heuristics aimed at establishing a diverse set of groups. Each group may be configured to utilize additional lottery functions such as lottery function 204. Each group of participating devices may be configured to perform its own secure multiparty computations with the private datasets of its participating devices to produce sub localized models. A "sub localized model," as used in this disclosure, is any localized model as described herein resulting from a multiparty computation conducted among the participating devices within each group. Random sampling scheme 200 may include randomly selecting a group. In some embodiments, each group may utilize additional lottery functions to train and produce sub localized models and prevent them from diverging too much from each other. For example and without limitation, the lottery function may include periodically averaging weights from the selected group and/or selected participating devices to be used to train another model such as joint model 168. Persons skilled in the art, upon reviewing the entirety of this disclosure, will be aware of the various embodiments of a random sampling scheme in selecting datasets from a large number of participants in the context of decentralized testing.

In a non-limiting embodiment, and still referring to FIG. 2, first group 208 may include a plurality of participating devices, such as device 212a, device 212b, and device 216c, wherein each participating device of first group 208 includes proof 216a, proof 216b, and 216c, respectively, as shown in FIG. 2. Each device has a proof representing a "lottery ticket" to be posted onto immutable sequential listing 144 and be verified. Each participating device of 208 may include its own private dataset to be used to its own localized model and/or a joint model such as sub localized model 220. Similarly, second group 224 may include a plurality of participating devices, such as device 228a, device 228b, and device 228c, wherein each participating device of second group 224 includes proof 232a, proof 232b, and 232c, respectively, as shown in FIG. 2. Each device has a proof representing a "lottery ticket" to be posted onto immutable sequential listing 144 and be verified. Each participating device of 208 may include its own private dataset to be used to its own localized model and/or a joint model such as sub localized model 236.

With continued reference to FIG. 2, the selected participating devices and/or selected sub localized model 240 may be the sub localized model produced from the participating devices with proofs containing cryptographic hashes that qualify based on an accuracy threshold as described above. For example, the selected group and/or selecting participating devices may be first group 208 and its participating devices. Random sampling scheme 200 may result in the selection of sub localized model 220, which is the joint model from first group 208, to be trained with first localized model 152. Computing device 100 may perform joint training protocol 156 using selected sub localized model 240 and first localized model 152 using any joint training protocol method as described herein to generate joint training datum 164 and/or joint model 168. Persons skilled in the art, upon reviewing the entirety of this disclosure, will be aware of using multiple models in the context of random sampling as described herein.

Figure 3:
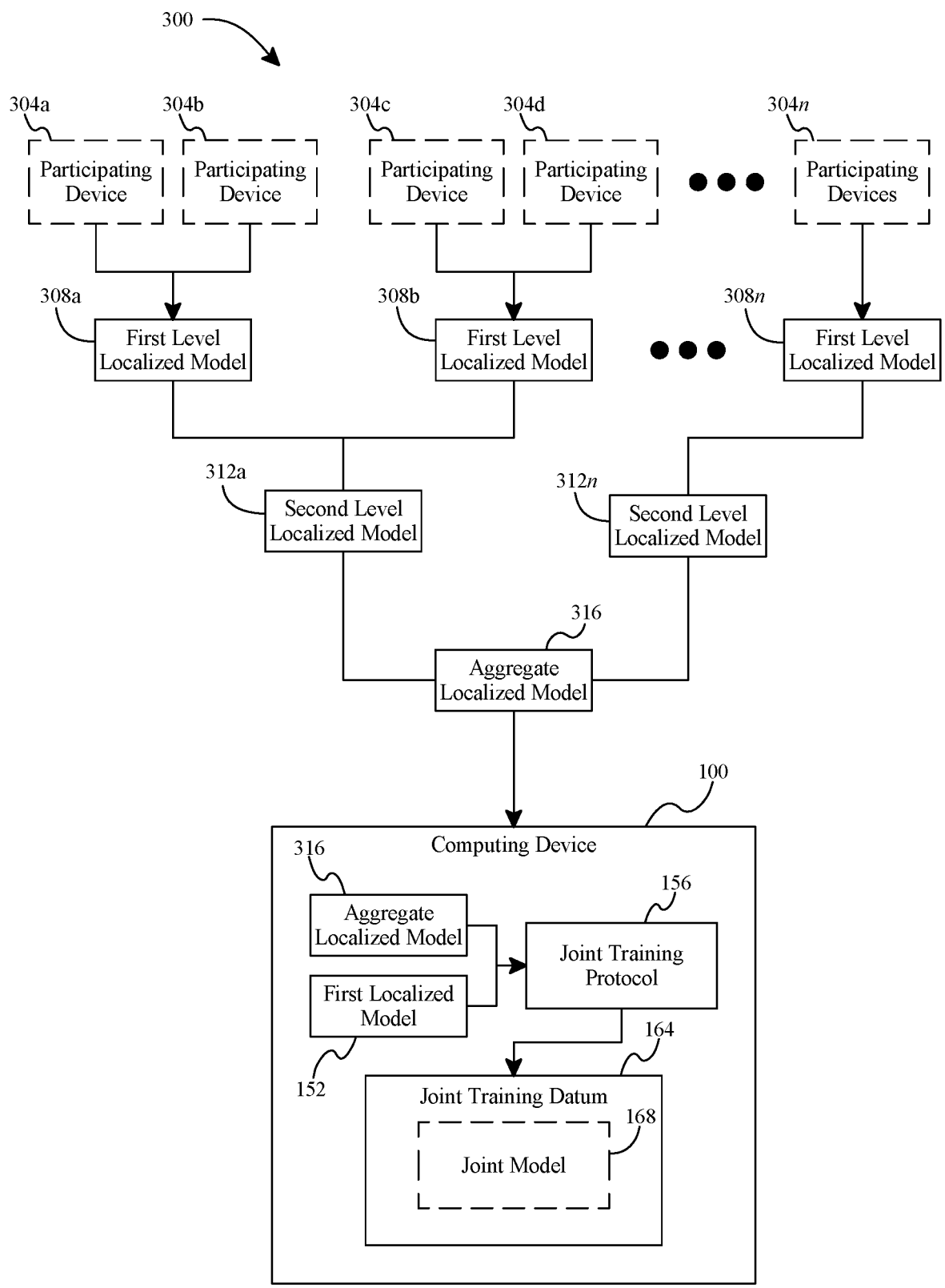
FIG. 3 is a block diagram of another exemplary embodiment of scalable multiparty computation.

Referring now to FIG. 3, a block diagram of another exemplary embodiment of scalable multiparty computation 300 is illustrated. In a non-limiting embodiment, an exceeding number of participating devices may be qualified than what is necessary for a secure multiparty computation of secure multiparty computation request 104. Scalable multiparty computation 300 may include a hierarchical aggregation scheme. A "hierarchical aggregation scheme," as used in this disclosure, is a training scheme consisting of dividing individual participants into groups wherein each group conducts its own secure multiparty computation wherein the results are used as inputs for another secure multiparty computation and culminating in an overall result. Alternatively or additionally, hierarchical aggregation schemes may include a cryptographic accumulator as described in U.S. patent application Ser. No. 16/884,460. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set.

In a non-limiting embodiment, and still referring to FIG. 1, computing device 100 may utilize a hierarchical aggregation scheme to group a plurality of participating devices. Each group conducts its own secure multiparty computation. For example and without limitation, participating devices may be initially grouped to produce first level localized model. A "first level localized model," as used in this disclosure, is a localized model generated from an initial group of participating devices. A plurality of groups may produce a plurality of first level localized models which may then be used to train and/or produce another model such as a second level localized model. A "second level localized model," as used in this disclosure, is a localized model generated using a plurality of first level localized models as inputs. In a non-limiting embodiment, a plurality of first level localized models may be grouped to produce a joint model such as a second level localized model. For example and without limitation, device 304a and device 304b may train and/or produce first level localized model 308a as a function of a secure multiparty computation between the two devices. Device 304c and device 304d may be grouped to train and/or produce first level localized model 308b. In a non-limiting embodiment, a plurality of participating device 304n may be present and configured to train and/or produce a plurality of first level localized models 308n. In another non-limiting example, a hierarchical aggregation scheme may incorporate a Merkle Tree. For instance, each dataset may be provided by a plurality of participating devices which produce a sub localized model based on their groupings, wherein each sub localized model represents a node within the Merkle Tree. Each higher node may represent another localized model generated using the previous sub localized models, until the top hash and/or node is reached, representing an aggregate localized model. Persons skilled in the art, upon reviewing the entirety of this disclosure, will be aware of the plurality of participating devices that may be used in the context of a hierarchical structuring of multiple multiparty computations.

Still referring to FIG. 3, first level localized model 308a and first level localized model 308b may train and/or produce second level localized model 312a. In some embodiments, first level localized model 308n may train and/or produce second localized model 312n. Second level localized model 312a and second level localized model 312n may then train and/or produce aggregate localized model 316. An "aggregate localized model," as used in this disclosure, is a joint model consisting of a plurality of combined localized models. In some embodiments, aggregate localized model 316 may include a culmination of sub localized models trained and/or produced by plurality of participating devices. Computing device 100 may then be configured to perform joint training protocol 156 using aggregate localized model 316 and first localized model 152 to generate joint training datum 164 and/or joint model 168. In a non-limiting embodiment, the hierarchical aggregation scheme may encompass a plurality of participating devices in which a plurality of levels of localized models may be generated. Persons skilled in the art, upon reviewing the entirety of this disclosure, will be aware of the various embodiments performing multiple multiparty computations in the context of scalability.

Figure 4:
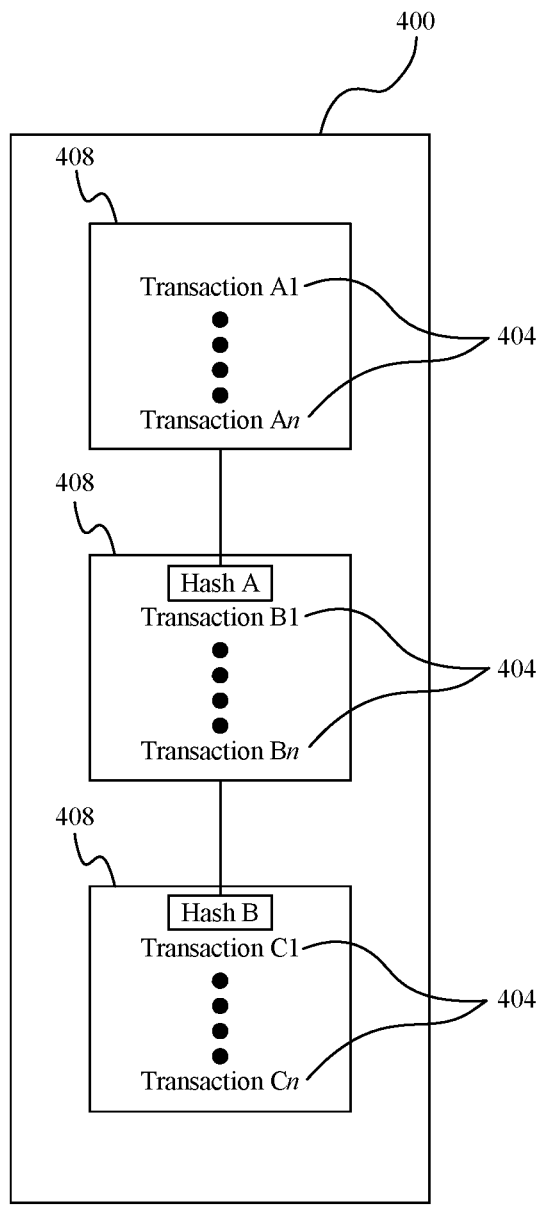
FIG. 4 is a block diagram of an exemplary embodiment of an immutable sequential listing.

Now referring to FIG. 4, a block diagram of an exemplary embodiment of an immutable sequential listing 400 is illustrated. In a non-limiting embodiment, immutable sequential listing 400 may be consistent with immutable sequential listing 144 as shown in FIG. 1. Data elements may be listed in immutable sequential listing 400; data elements may include any form of data, including textual data, image data, encrypted data, cryptographically hashed data, and the like. Data elements may include, without limitation, one or more at least a digitally signed assertions. In one embodiment, a digitally signed assertion 404 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or ciphertext data; in an embodiment, collection of textual data may be encrypted, or may be a hash of other data, such as a root 308 or node 304 of a Merkle tree or hash tree, or a hash of any other information desired to be recorded in some fashion using a digitally signed assertion 404. In a non-limiting embodiment, digitally signed assertion 404 may include any cryptographic commitment as described herein. In an embodiment, collection of textual data states that the owner of a certain transferable item represented in a digitally signed assertion 404 register is transferring that item to the owner of an address. A digitally signed assertion 404 may be signed by a digital signature created using the private key associated with the owner's public key, and/or any other suitable digital signature protocol.

Still referring to FIG. 4, a digitally signed assertion 404 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 404 may describe the transfer of a physical good; for instance, a digitally signed assertion 404 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 404 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 4, in one embodiment, an address is a textual datum identifying the recipient of virtual currency or another item of value in a digitally signed assertion 404. In some embodiments, address is linked to a public key, the corresponding private key of which is owned by the recipient of a digitally signed assertion 404. For instance, address may be the public key. Address may be a representation, such as a hash, of the public key. Address may be linked to the public key in memory of a computing device 104, for instance via a "wallet shortener" protocol. Where address is linked to a public key, a transferee in a digitally signed assertion 404 may record a subsequent a digitally signed assertion 404 transferring some or all of the value transferred in the first a digitally signed assertion 404 to a new address in the same manner. A digitally signed assertion 404 may contain textual information that is not a transfer of some item of value in addition to, or as an alternative to, such a transfer. For instance, as described in further detail below, a digitally signed assertion 404 may indicate a confidence level associated with a distributed storage node 304 as described in further detail below.

In an embodiment, and still referring to FIG. 4 immutable sequential listing 400 records a series of postings in a way that preserves the order in which the postings took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 400 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 4, immutable sequential listing 400 may preserve the order in which the postings took place by listing them in chronological order; alternatively or additionally, immutable sequential listing 400 may organize digitally signed assertions 404 into sub-listings 408 such as "blocks" in a blockchain, which may be themselves collected in a temporally sequential order; digitally signed assertions 404 within a sub-listing 408 may or may not be temporally sequential. The ledger may preserve the order in which postings took place by listing them in sub-listings 408 and placing the sub-listings 408 in chronological order. The immutable sequential listing 400 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add postings to the ledger, but may not allow any users to alter postings that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 400 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 4, immutable sequential listing 400, once formed, may be inalterable by any party, no matter what access rights that party possesses. For instance, immutable sequential listing 400 may include a hash chain, in which data is added during a successive hashing process to ensure non-repudiation. Immutable sequential listing 400 may include a blockchain. In one embodiment, a blockchain is immutable sequential listing 400 that records one or more new postings in a data item known as a sub-listing 408 or "block." An example of a blockchain is the BITCOIN blockchain used to record BITCOIN transactions and values. Sub-listings 408 may be created in a way that places the sub-listings 408 in chronological order and link each sub-listing 408 to a previous sub-listing 408 in the chronological order so that any computing device 104 may traverse the sub-listings 408 in reverse chronological order to verify any postings listed in the blockchain. Each new sub-listing 408 may be required to contain a cryptographic hash describing the previous sub-listing 408. In some embodiments, the blockchain contains a single first sub-listing 408 sometimes known as a "genesis block."

Still referring to FIG. 4, the creation of a new sub-listing 408 may be computationally expensive; for instance, the creation of a new sub-listing 408 may be designed by a "proof of work" protocol accepted by all participants in forming the immutable sequential listing 400 to take a powerful set of computing devices 104 a certain period of time to produce. Where one sub-listing 408 takes less time for a given set of computing devices 104 to produce the sub-listing 408 protocol may adjust the algorithm to produce the next sub-listing 408 so that it will require more steps; where one sub-listing 408 takes more time for a given set of computing devices 104 to produce the sub-listing 408 protocol may adjust the algorithm to produce the next sub-listing 408 so that it will require fewer steps. As an example, protocol may require a new sub-listing 408 to contain a cryptographic hash describing its contents; the cryptographic hash may be required to satisfy a mathematical condition, achieved by having the sub-listing 408 contain a number, called a nonce, whose value is determined after the fact by the discovery of the hash that satisfies the mathematical condition. Continuing the example, the protocol may be able to adjust the mathematical condition so that the discovery of the hash describing a sub-listing 408 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 408 according to the protocol is known as "mining." The creation of a new sub-listing 408 may be designed by a "proof of stake" protocol as will be apparent to those skilled in the art upon reviewing the entirety of this disclosure.

Continuing to refer to FIG. 4, in some embodiments, protocol also creates an incentive to mine new sub-listings 408. The incentive may be financial; for instance, successfully mining a new sub-listing 408 may result in the person or entity that mines the sub-listing 408 receiving a predetermined amount of currency. In a non-limiting embodiment, the currency may be governed by a smart contract of secure multiparty computation 104 and/or contingent payment 108. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 408 Each sub-listing 408 created in immutable sequential listing 400 may contain a record or posting describing one or more addresses that receive an incentive, such as virtual currency, as the result of successfully mining the sub-listing 408.

With continued reference to FIG. 4, where two entities simultaneously create new sub-listings 408, immutable sequential listing 400 may develop a fork; protocol may determine which of the two alternate branches in the fork is the valid new portion of the immutable sequential listing 400 by evaluating, after a certain amount of time has passed, which branch is longer. "Length" may be measured according to the number of sub-listings 408 in the branch. Length may be measured according to the total computational cost of producing the branch. Protocol may treat only postings contained in a valid branch as valid postings. When a branch is found invalid according to this protocol, postings registered in that branch may be recreated in a new sub-listing 408 in the valid branch; the protocol may reject "double spending" postings that transfer the same virtual currency that another posting in the valid branch has already transferred. As a result, in some embodiments the creation of fraudulent postings requires the creation of a longer immutable sequential listing 400 branch by the entity attempting the fraudulent postings than the branch being produced by the rest of the participants; as long as the entity creating the fraudulent postings is likely the only one with the incentive to create the branch containing the fraudulent postings, the computational cost of the creation of that branch may be practically infeasible, guaranteeing the validity of all postings in the immutable sequential listing 400.

Still referring to FIG. 4, additional data linked to postings may be incorporated in sub-listings 408 in the immutable sequential listing 400; for instance, data may be incorporated in one or more fields recognized by blockchain protocols that permit a person or computer forming a posting to insert additional data in the immutable sequential listing 400. In some embodiments, additional data is incorporated in an unspendable postings field. For instance, the data may be incorporated in an OP RETURN within the BITCOIN blockchain. In other embodiments, additional data is incorporated in one signature of a multi-signature posting. In an embodiment, a multi-signature posting is posting to two or more addresses. In some embodiments, the two or more addresses are hashed together to form a single address, which is signed in the digital signature of the posting. In other embodiments, the two or more addresses are concatenated. In some embodiments, two or more addresses may be combined by a more complicated process, such as the creation of a Merkle tree or the like. In some embodiments, one or more addresses incorporated in the multi-signature posting are typical cryptocurrency addresses, such as addresses linked to public keys as described above, while one or more additional addresses in the multi-signature posting contain additional data related to the posting; for instance, the additional data may indicate the purpose of the posting, aside from an exchange of virtual currency, such as the item for which the virtual currency was exchanged. In some embodiments, additional information may include network statistics for a given node 304 of network, such as a distributed storage node 304, e.g. the latencies to nearest neighbors in a network graph, the identities or identifying information of neighboring nodes 304 in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node 304) of neighboring nodes 304 in the network graph, IP addresses, GPS coordinates, and other information informing location of the node 304 and/or neighboring nodes 304, geographically and/or within the network graph. In some embodiments, additional information may include history and/or statistics of neighboring nodes 304 with which the node 304 has interacted. In some embodiments, this additional information may be encoded directly, via a hash, hash tree or other encoding.

With continued reference to FIG. 4, in some embodiments, virtual currency is traded as a cryptocurrency. In one embodiment, a cryptocurrency is a digital currency such as Bitcoins, Peercoins, Namecoins, and Litecoins. Cryptocurrency may be a clone of another cryptocurrency. The cryptocurrency may be an "alt-coin." Cryptocurrency may be decentralized, with no particular entity controlling it; the integrity of the cryptocurrency may be maintained by adherence by its participants to established protocols for exchange and for production of new currency, which may be enforced by software implementing the cryptocurrency. Cryptocurrency may be centralized, with its protocols enforced or hosted by a particular entity. For instance, cryptocurrency may be maintained in a centralized ledger, as in the case of the XRP currency of Ripple Labs, Inc., of San Francisco, Calif. In lieu of a centrally controlling authority, such as a national bank, to manage currency values, the number of units of a particular cryptocurrency may be limited; the rate at which units of cryptocurrency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 408 in a blockchain computationally challenging; the incentive for producing sub-listings 408 may include the grant of new cryptocurrency to the miners. Quantities of cryptocurrency may be exchanged using one or more postings as described above.

Figure 5:
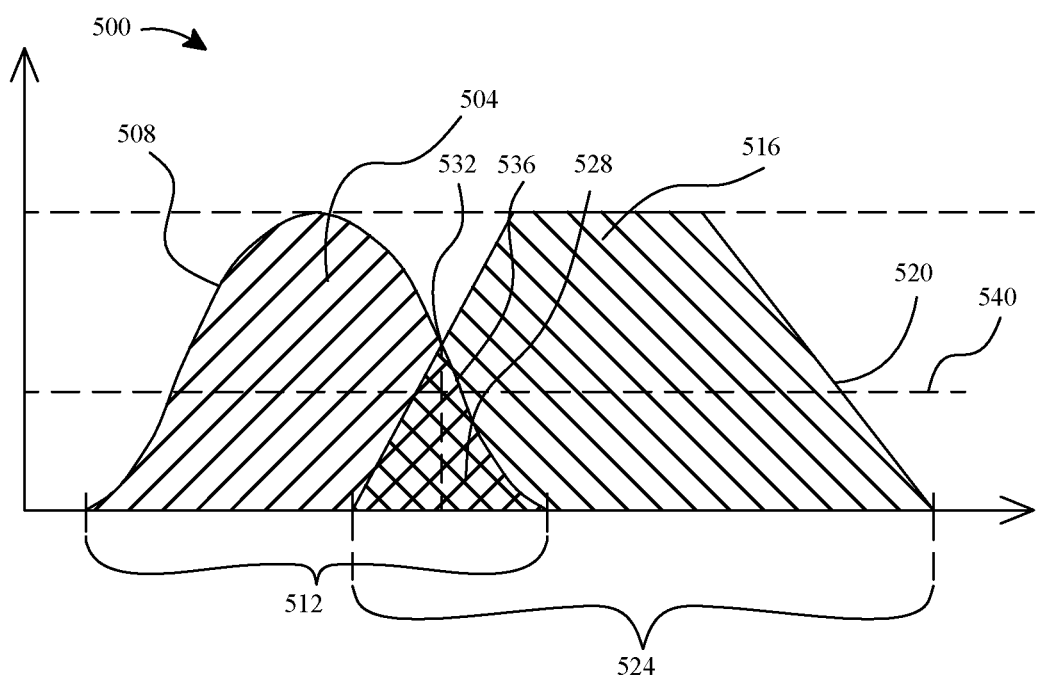
FIG. 5 is an illustration of an exemplary embodiment of a fuzzy set comparison.

Now referring to FIG. 5, an exemplary embodiment of fuzzy set comparison 500 is illustrated. In a non-limiting embodiment, fuzzy set comparison 500 may include a verification of any private dataset and/or model of an issuer of a secure multiparty computation request based on accuracy threshold as described above. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 504 may represent any value or combination of values as described above, including predictive prevalence value, probabilistic outcome, any resource datum, any niche datum, and/or any combination of the above. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 228 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between first private dataset 116 and/or second private dataset 124 as described above. In another example, threshold may indicate a degree of overlap between joint model 168 and second localized model 124 as described above. There may be multiple thresholds; for instance, a second threshold may indicate a sufficient match for purposes of accuracy threshold 172 as described in this disclosure. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if two or more localized models of a quorum of participating devices have fuzzy sets matching a probabilistic outcome fuzzy set by having a degree of overlap exceeding a threshold, computing device 100 may further rank the two or more resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources. In some cases, the ranking may be used to determine which participating device behaved inappropriately in a secure multiparty computation, wherein the participating device ranked last is the first suspect.

Figure 6:
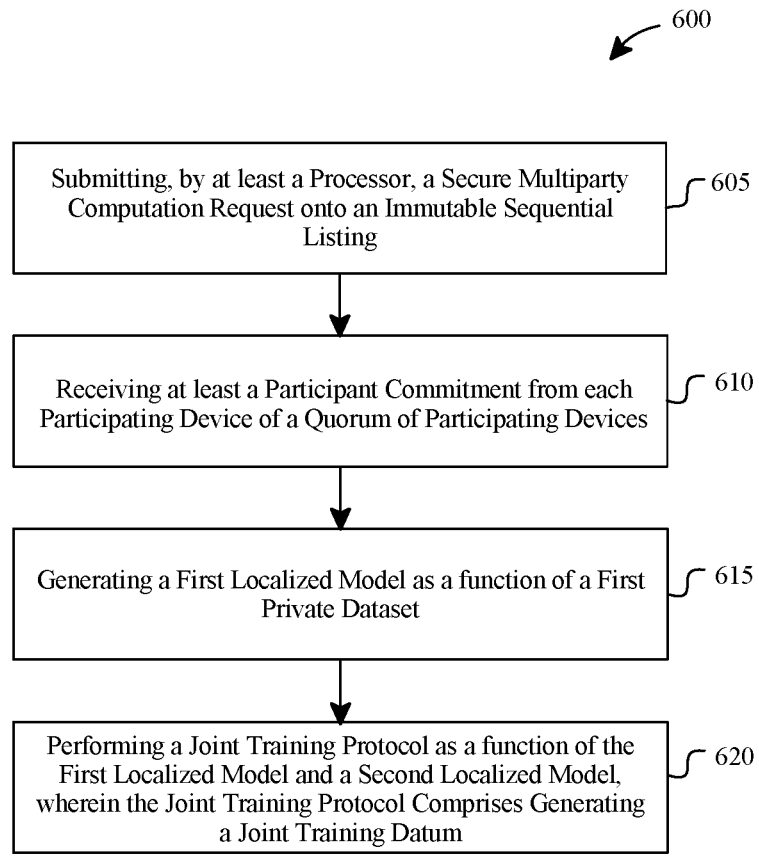
FIG. 6 is a flow diagram of an exemplary embodiment of a method for secure multiparty computations for machine-learning.

Referring now to FIG. 6, a flow diagram of an exemplary embodiment of a method 600 for secure multiparty computations for machine-learning is illustrated. At step 605, method 600 includes submitting, by at least a processor instructed by a communicatively connected memory, a secure multiparty computation request onto an immutable sequential listing, wherein the secure multiparty computation request includes a contingent payment and an authenticity commitment of a first private dataset. The secure multiparty computation request may be consistent with any secure multiparty computation request as described in the entirety of this disclosure. The immutable sequential listing may include any immutable sequential listing as described herein. In a non-limiting embodiment, method 600 may embody a computing device configured to include the memory and the at least a processor. The computing device may include any computing device as described herein. Persons skilled in the art, upon reviewing the entirety of this disclosure, will be aware of the various methods of providing instructions in the initial submission of a secure multiparty computation for purposes as described herein.

Still referring to FIG. 6, at step 610, method 600 includes receiving at least a participant commitment from each participating device of a quorum of participating devices. The quorum of participating devices may include any quorum of participating devices as described herein. The participant commitment may include any participant commitment as described herein. In a non-limiting embodiment, each participating device may include a computing device similar to the computing device submitting the secure multiparty computation request. Persons skilled in the art, upon reviewing the entirety of this disclosure, will be aware of the various participants required in a secure multiparty computation for purposes as described herein.

Still referring to FIG. 6, at step 615, method includes generating a first localized model as a function of the first private dataset. The first localized model may include any first localized model as described herein. The first private dataset may include any first private dataset as described herein. In a non-limiting embodiment, method 600 may include generating the first localized model as a function of a localized machine-learning model. The localized machine-learning model may include any localized machine-learning model as described herein. Persons skilled in the art, upon reviewing the entirety of this disclosure, will be aware of the various embodiments and methods of generating a model in the context of machine-learning.

Still referring to FIG. 6, at step 6120, method 600 may include performing a joint training protocol as a function of the first localized model and a second localized model from the quorum of participating devices, wherein the joint training protocol comprises generating a joint training datum. The joint training protocol may be consistent with any joint protocol as described in the entirety of this disclosure. The joint training datum may include any joint training datum as described herein. The joint model may include any joint model as described herein. In a non-limiting embodiment, method 600 may include generating the joint training datum and/or joint model as a function of a multiparty dataset machine-learning model. The multiparty dataset machine-learning model may include any multiparty dataset machine-learning model as described herein. Persons skilled in the art, upon reviewing the entirety of this disclosure, will be aware of the various embodiments of methods of generating a combined model in the context of multiparty computation and decentralized testing.

In a non-limiting embodiment, and still referring to FIG. 6, method 600 may include enabling verification of the joint training datum by revealing the first private dataset to the quorum of participating devices. Verification may include any verification and/or validation as described herein. In a non-limiting embodiment, method 600 may include verifying the joint training datum based on an accuracy threshold. The accuracy threshold may include any accuracy threshold as described herein. In another non-limiting embodiment, method 600 may include executing a contingent payment to each participating device as a function of a confirmation commitment posted onto the immutable sequential listing by each participating device. The contingent payment may include any contingent payment as described herein. The confirmation commitment may include a confirmation commitment as described herein. In some embodiments, the confirmation commitment may include a multisignature attesting the integrity of a participating device. The multisignature may include any multisignature as described herein. For example and without limitation, method 600 may include cancelling the contingent payment back as a function of the multisignature attesting at least one participating device lacking integrity. In another embodiment, the secure multiparty computation request may include a timeout configured to cancel the secure multiparty computation request. Persons skilled in the art, upon reviewing the entirety of this disclosure, will be aware of the various methods of verification in the context of secure multiparty computation and transaction.

In a non-limiting embodiment, and still referring to FIG. 6, method 600 may include scaling the secure multiparty computation. In a non-limiting embodiment, method 600 may include performing a random sampling scheme, wherein the random sampling scheme includes dividing a plurality of participating devices into a plurality of groups as a function of a lottery function, wherein each group is configured to generate a sub localized model, randomly selecting a group, and executing the joint training protocol wherein using the first localized model and the selected sub localized model. Persons skilled in the art, upon reviewing the entirety of this disclosure, will be aware of the various methods of a random sampling scheme in the context of scalability of multiple secure multiparty computations.

In a non-limiting embodiment, and still referring to FIG. 6, method 600 may include performing a hierarchical aggregation scheme, wherein the hierarchical aggregation scheme includes dividing a plurality of participating devices into a plurality of groups, wherein each group is configured to generate a joint localized model as a function of a sub localized training protocol, executing an aggregate localized training protocol using each joint localized model of the plurality of groups, wherein the second localized training protocol includes generating an aggregate localized model, and producing the joint protocol datum as a function of the joint training protocol, wherein the joint training protocol is executed as function of the first localized model and the aggregate localized model. Persons skilled in the art, upon reviewing the entirety of this disclosure, will be aware of the various methods of a hierarchical structuring of secure multiparty computations in the context of scalability.

Figure 7:
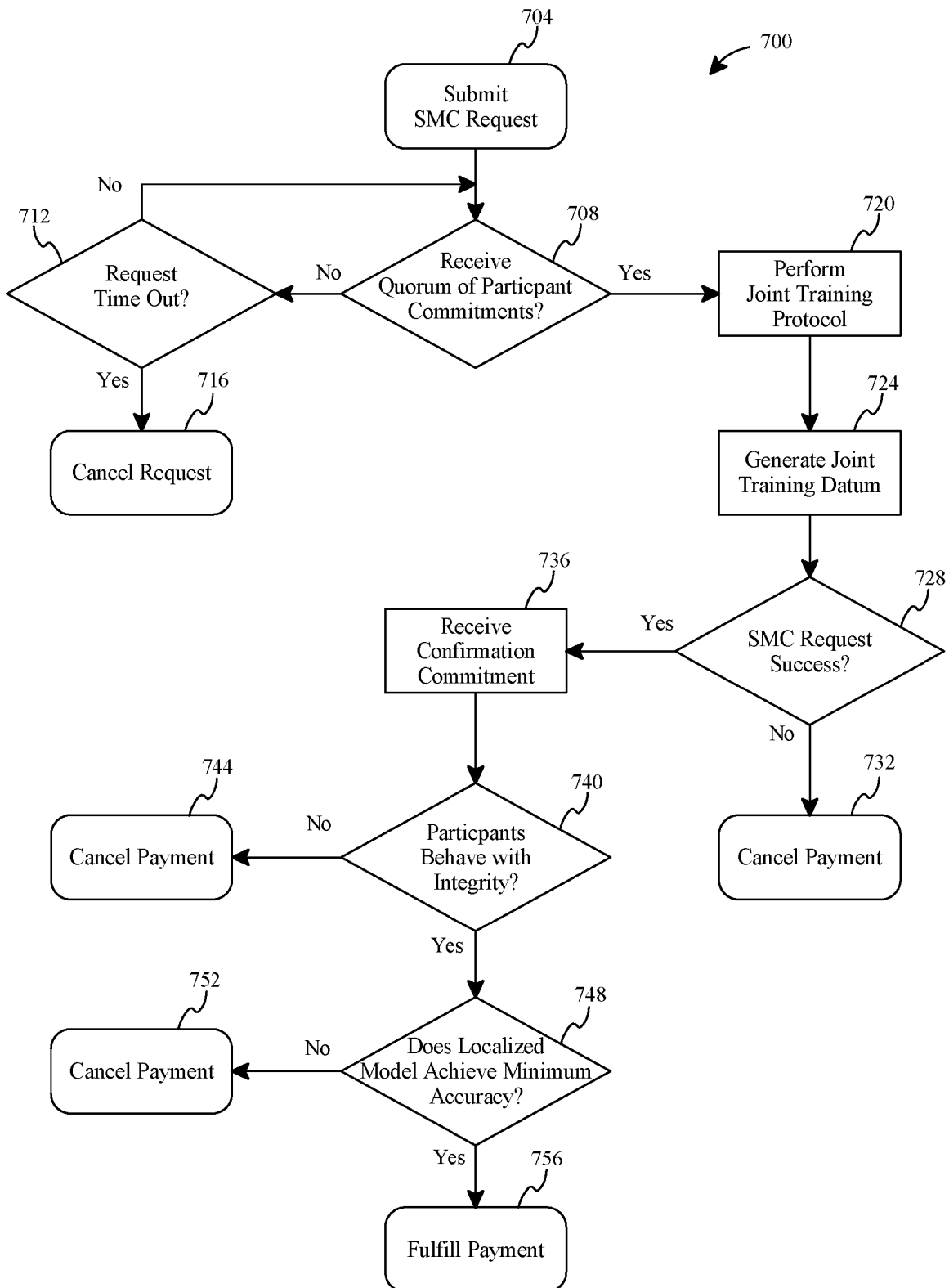
FIG. 7 is a flow chart of another exemplary embodiment of a method for secure multiparty computations for machine-learning.

Referring now to FIG. 7, a flow chart of another exemplary embodiment of a method 700 for secure multiparty computations for machine-learning is illustrated. At step 704, a computing device may submit a secure multiparty computation (SMC) request. The computing device may post a cryptographic commitment onto an immutable sequential listing to find a quorum of participating devices for the secure multiparty computation. At step 708, if the computing device did not receive a quorum of participating devices and/or participant commitments, the secure multiparty computation request may be subject to being timed out. At step 712, in the event the quorum is not received, the secure multiparty computation request may still be posted onto immutable sequential listing based on a timeout. If the timeout has been reached and/or a timer contingent with the secure multiparty computation request runs out, the secure multiparty computation request as canceled at step 716. If the secure multiparty computation request has not yet timed out, it continues to be pending for the quorum of participating devices and/or participant commitments to be received back at step 708.

Still referring to FIG. 7, once the quorum of participating devices and/or participant commitments has been received, the computing device may then perform a joint training protocol at step 720. The result of the joint training protocol is the joint training datum as seen at step 724. At step 728, the participating parties of the secure multiparty computation may determine whether the secure multiparty computation was a success or failure. The success or failure may be determined based on some accuracy threshold or if a minimum accuracy is achieved. If the secure multiparty computation was not successful, the contingent payment is canceled, and participant commitment is returned to the quorum of participating devices at step 732. If the secure multiparty computation was successful, the computing device may receive a confirmation commitment from each participating device of the quorum at step 736. The confirmation commitment may include a zero knowledge proof denoting the integrity of the private dataset and/or model contributed by each participating device in the secure multiparty computation. At step 740, the computing device verifies if each participating device behaved appropriately and/or with integrity in the secure multiparty computation which generated the training protocol datum. In the event one or more participating devices behaved without integrity or is revealed to have provided manipulated private datasets and/or models from their zero knowledge proofs, each participating device forfeits the contingent payment and its confirmation commitment. In the event the participating devices behaved with integrity, at step 748, the participants of the secure multiparty computation may verify if the private datasets and/or models are comparable and/or fall within some accuracy. This is so, at least in part, to verify if the final result represented by training protocol datum is not biased and/or unfairly skewed by a participating device's data. In the event the revealed individual datasets and/or models fail to achieve some minimum accuracy, the secure multiparty computation may be deemed unsuccessful and/or unsatisfactory in which the contingent payment and confirmation commitments are forfeited by the participating devices at step 752. In the event the revealed individual datasets and/or models achieve a minimum accuracy, the secure multiparty computation is completed, and the contingent payment is executed at step 756.

Figure 8:
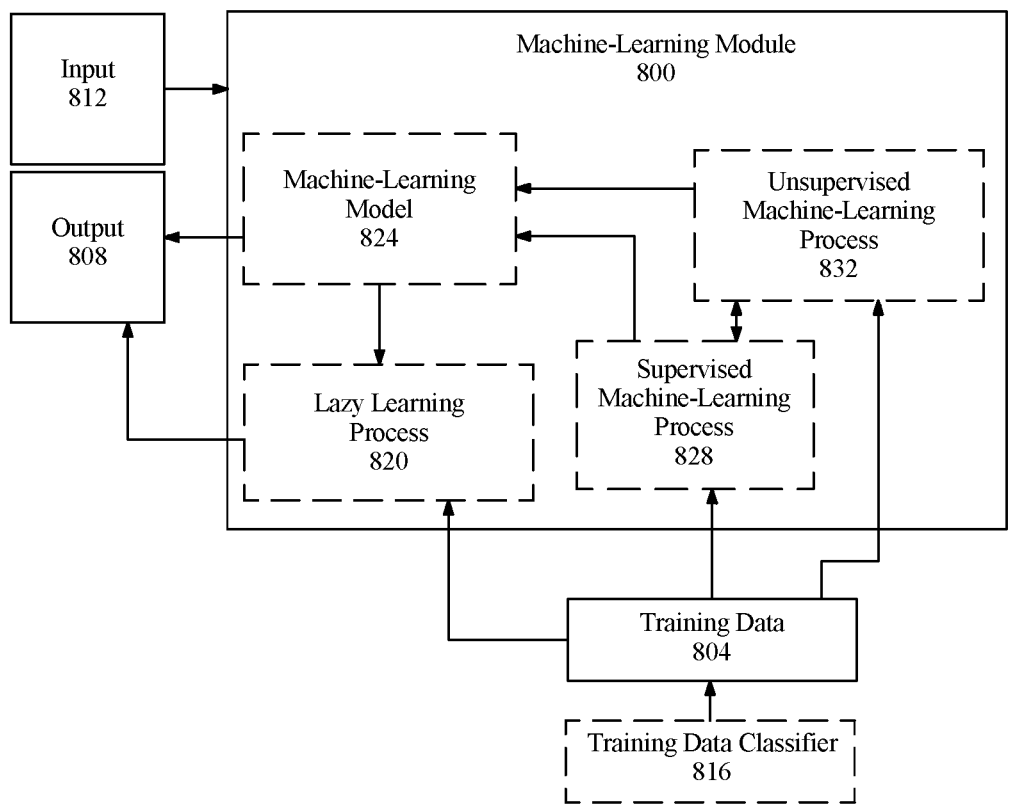
FIG. 8 is a block diagram of an exemplary embodiment of a machine-learning model.

Referring now to FIG. 8, an exemplary embodiment of a machine-learning module 800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 804 to generate an algorithm that will be performed by a computing device/module to produce outputs 808 given data provided as inputs 812; this is in contrast to a non-machine learning software program where the commands to be executed are determined in advance by a user and written in a programming language.

Still referring to FIG. 8, "training data," as used herein, is data containing correlations that a machine-learning process may use to model relationships between two or more categories of data elements. For instance, and without limitation, training data 804 may include a plurality of data entries, each entry representing a set of data elements that were recorded, received, and/or generated together; data elements may be correlated by shared existence in a given data entry, by proximity in a given data entry, or the like. Multiple data entries in training data 804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 804 according to various correlations; correlations may indicate causative and/or predictive links between categories of data elements, which may be modeled as relationships such as mathematical relationships by machine-learning processes as described in further detail below. Training data 804 may be formatted and/or organized by categories of data elements, for instance by associating data elements with one or more descriptors corresponding to categories of data elements. As a non-limiting example, training data 804 may include data entered in standardized forms by persons or processes, such that entry of a given data element in a given field in a form may be mapped to one or more descriptors of categories. Elements in training data 804 may be linked to descriptors of categories by tags, tokens, or other data elements; for instance, and without limitation, training data 804 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 8, training data 804 may include one or more elements that are not categorized; that is, training data 804 may not be formatted or contain descriptors for some elements of data. Machine-learning algorithms and/or other processes may sort training data 804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 804 to be made applicable for two or more distinct machine-learning algorithms as described in further detail below. Training data 804 used by machine-learning module 800 may correlate any input data as described in this disclosure to any output data as described in this disclosure. As a non-limiting illustrative example private datasets may be an input and a localized model may be an output. In another non-limiting example, localized models may be inputs and a training protocol datum and/or joint model may be outputs.

Further referring to FIG. 8, training data may be filtered, sorted, and/or selected using one or more supervised and/or unsupervised machine-learning processes and/or models as described in further detail below; such models may include without limitation a training data classifier 816. Training data classifier 816 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 800 may generate a classifier using a classification algorithm, defined as a process whereby a computing device and/or any module and/or component operating thereon derives a classifier from training data 804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 8, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 8, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute 1 as derived using a Pythagorean norm: [Equation], where ai is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 8, machine-learning module 800 may be configured to perform a lazy-learning process 820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 804. Heuristic may include selecting some number of highest-ranking associations and/or training data 804 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 8, machine-learning processes as described in this disclosure may be used to generate machine-learning models 824. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 824 may be generated by creating an artificial neural network, such as a convolutional neural network comprising an input layer of nodes, one or more intermediate layers, and an output layer of nodes. Connections between nodes may be created via the process of "training" the network, in which elements from a training data 804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, machine-learning algorithms may include at least a supervised machine-learning process 828. At least a supervised machine-learning process 828, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any inputs as described above as inputs, any outputs as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 804. Persons skilled in the art, upon reviewing the entirety of this disclosure, will be aware of various possible variations of at least a supervised machine-learning process 828 that may be used to determine relation between inputs and outputs. Supervised machine-learning processes may include classification algorithms as defined above.

Further referring to FIG. 8, machine learning processes may include at least an unsupervised machine-learning processes 832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 8, machine-learning module 800 may be designed and configured to create a machine-learning model 824 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 8, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
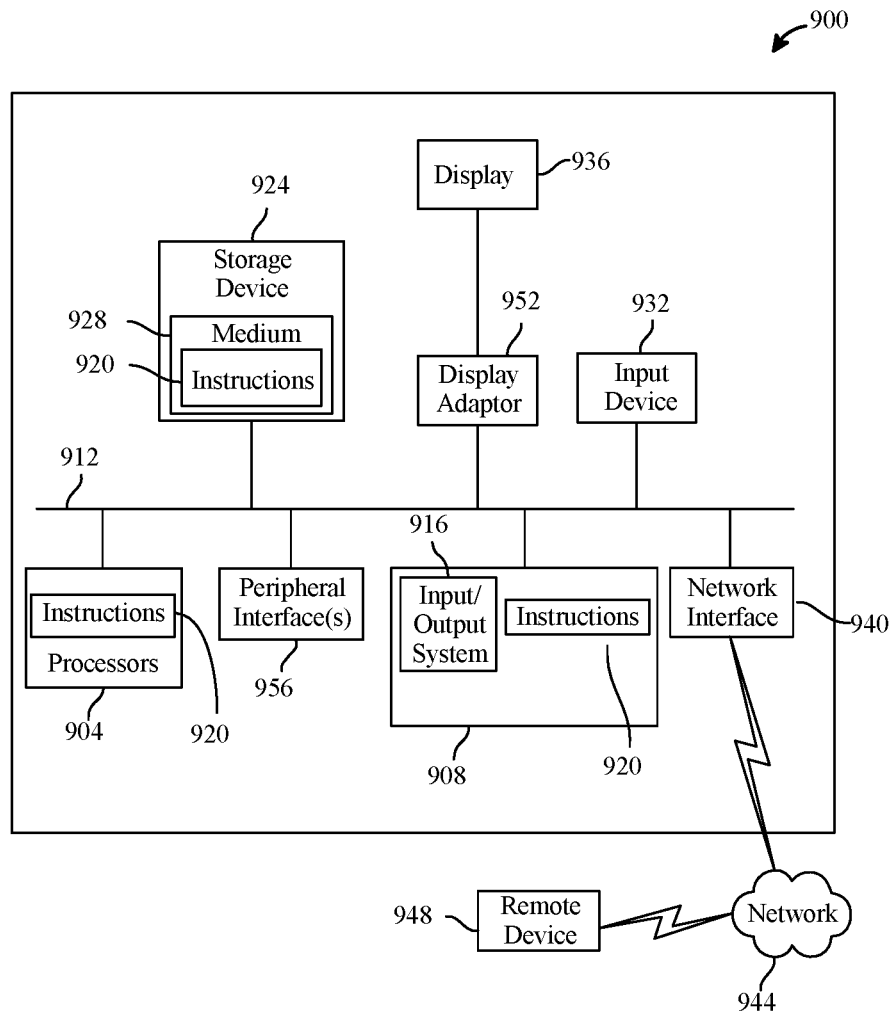
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, apparatuses, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for secure multiparty computations for machine-learning,
   the apparatus comprising at least a processor; and
   a memory communicatively connected to the at least a processor, the memory containing instructions configured the at least a processor to:
      submit a secure multiparty computation request onto an immutable sequential listing, wherein the secure multiparty computation request comprises:
         a contingent payment; and
         an authenticity commitment of a first private dataset, wherein the authenticity commitment further comprises a cryptographic commitment to data indicating reliability of the first private dataset;
      receive at least a participant commitment from each participating device of a quorum of participating devices, wherein each at least a participant commitment further comprises a cryptographic commitment representing an intention of the participating device to partake in a secure multiparty computation corresponding to the secure multiparty computation request;
      generate a first localized model as a function of the first private dataset wherein the first localized model is further generated using a localized machine learning model trained with inputs of exemplary first private datasets correlated to outputs of exemplary consolidated private datasets, wherein the machine learning model further comprises generating a local gradient on the first private dataset to output the first localized model;
      perform a joint training protocol as a function of the first localized model and a second localized model from the quorum of participating devices, wherein the joint training protocol comprises generating a joint training datum, wherein performing the joint training protocol comprises generating a multiparty dataset machine learning model configured to utilize an ensemble method to combine the first localized model and the second localized model; and
      verify the joint training datum, wherein verifying the joint training datum includes receiving a plurality of proofs from each participating device of the quorum of participating devices, wherein verifying the joint training datum comprises validating the generated multiparty dataset machine learning model as a function of an accuracy threshold.

2. The apparatus of claim 1, wherein the joint training protocol further comprises:
   training a multiparty dataset machine-learning model; and
   outputting the joint training datum as a function of the multiparty dataset machine-learning model.

3. The apparatus of claim 1, wherein the at least a processor is further configured to enable verification of the joint training datum by publicizing the first private dataset to the quorum of participating devices.

4. The apparatus of claim 3, wherein the joint training datum is verified based on an accuracy threshold.

5. The apparatus of claim 1, wherein the at least a processor is further configured to execute the contingent payment to each participating device as a function of a confirmation commitment posted onto the immutable sequential listing by each participating device.

6. The apparatus of claim 5, wherein the confirmation commitment further comprises a multisignature attesting an integrity of a participating device.

7. The apparatus of claim 6, wherein the at least a processor is further configured to cancel the contingent payment as a function of the multisignature attesting at least one participating device lacking integrity.

8. The apparatus of claim 1, wherein the secure multiparty computation request comprises a timeout element configured to cancel the secure multiparty computation request upon lapsing.

9. The apparatus of claim 1, wherein the joint training protocol comprises a random sampling scheme, wherein the random sampling scheme comprises:
   dividing a plurality of participating devices into a plurality of groups as a function of a lottery function, wherein each group is configured to generate a sub localized model;
   randomly selecting a group; and
   executing the joint training protocol wherein using the first localized model and the selected sub localized model.

10. The apparatus of claim 1, wherein the joint training protocol further comprises a hierarchical aggregation scheme, wherein the hierarchical aggregation scheme comprises:
    dividing a plurality of participating devices into a plurality of groups, wherein each group is configured to generate a joint localized model as a function of a sub localized training protocol;
    executing an aggregate localized training protocol using each joint localized model of the plurality of groups, wherein the second localized training protocol comprises generating an aggregate localized model; and
    producing the joint protocol datum as a function of the joint training protocol, wherein the joint training protocol is executed as function of the first localized model and the aggregate localized model.

11. A method for secure multiparty computations for machine-learning, the method comprising:

submitting, by at least a processor instructed by a communicatively connected memory, a secure multiparty computation request onto an immutable sequential listing, wherein the secure multiparty computation request comprises:
- a contingent payment; and
- an authenticity commitment of a first private dataset, wherein the authenticity commitment further comprises a cryptographic commitment to data indicating reliability of the first private dataset;

receiving at least a participant commitment from each participating device of a quorum of participating devices, wherein each at least a participant commitment further comprises a cryptographic commitment representing an intention of the participating device to partake in a secure multiparty computation corresponding to the secure multiparty computation request;

generating a first localized model as a function of the first private dataset, wherein the first localized model is further generated using a localized machine learning model trained with inputs of exemplary first private datasets correlated to outputs of exemplary consolidated private datasets, wherein the machine learning model comprises generating a local gradient on the first private dataset to output the first localized model;

performing a joint training protocol as a function of the first localized model and a second localized model from the quorum of participating devices, wherein the joint training protocol comprises generating a joint training datum, wherein performing the joint training protocol comprises generating a multiparty dataset machine learning model configured to utilize an ensemble method to combine the first localized model and the second localized model; and verifying the joint training datum, wherein verifying the joint training datum includes receiving a plurality of proofs from each participating device of the quorum of participating devices, wherein verifying the joint training datum comprises validating the generated multiparty dataset machine learning model as a function of an accuracy threshold.

12. The method of claim 11, wherein the joint training protocol further comprises:
training a multiparty dataset machine-learning model; and
outputting the joint training datum as a function of the multiparty dataset machine-learning model.

13. The method of claim 11, wherein the method further comprises enabling verification of the joint training datum by revealing the first private dataset to the quorum of participating devices.

14. The method of claim 13, method further comprises verifying the joint training datum based on an accuracy threshold.

15. The method of claim 11, wherein the method further comprises executing the contingent payment to each participating device as a function of a confirmation commitment posted onto the immutable sequential listing by each participating device.

16. The method of claim 15, wherein the confirmation commitment further comprises a multisignature attesting an integrity of a participating device.

17. The method of claim 16, wherein the method further comprises cancelling the contingent payment back as a function of the multisignature attesting at least one participating device lacking integrity.

18. The method of claim 11, wherein the secure multiparty computation request comprises a timeout configured to cancel the secure multiparty computation request.

19. The method of claim 11, wherein the joint training protocol comprises a random sampling scheme, wherein the random sampling scheme comprises:
- dividing a plurality of participating devices into a plurality of groups as a function of a lottery function, wherein each group is configured to generate a sub localized model;
- randomly selecting a group; and
- executing the joint training protocol wherein using the first localized model and the selected sub localized model.

20. The method of claim 11, wherein the joint training protocol further comprises a hierarchical aggregation scheme, wherein the hierarchical aggregation scheme comprises:
- dividing a plurality of participating devices into a plurality of groups, wherein each group is configured to generate a joint localized model as a function of a sub localized training protocol;
- executing an aggregate localized training protocol using each joint localized model of the plurality of groups, wherein the second localized training protocol comprises generating an aggregate localized model; and
- producing the joint protocol datum as a function of the joint training protocol, wherein the joint training protocol is executed as function of the first localized model and the aggregate localized model.

* * * * *